(12) United States Patent
Nakayama

(10) Patent No.: US 9,285,602 B2
(45) Date of Patent: Mar. 15, 2016

(54) IMAGE BLUR CORRECTION APPARATUS AND IMAGING APPARATUS

(71) Applicant: Sony Corporation, Tokyo (JP)

(72) Inventor: Tatsuyuki Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 162 days.

(21) Appl. No.: 13/852,028

(22) Filed: Mar. 28, 2013

(65) Prior Publication Data
US 2013/0321917 A1 Dec. 5, 2013

(30) Foreign Application Priority Data
May 29, 2012 (JP) ................. 2012-122332

(51) Int. Cl.
*G02B 27/64* (2006.01)

(52) U.S. Cl.
CPC ...... *G02B 27/646* (2013.01); *G03B 2205/0023* (2013.01)

(58) Field of Classification Search
CPC ........ G02B 27/64; G02B 27/646; G03B 5/00; G03B 2205/0007; G03B 2205/0023
USPC ............... 359/554, 557; 396/55, 421
See application file for complete search history.

(56) References Cited

U.S. PATENT DOCUMENTS

| | | | |
|---|---|---|---|
| 2006/0285838 A1* | 12/2006 | Mashima et al. | 396/55 |
| 2009/0052037 A1* | 2/2009 | Wernersson | 359/554 |
| 2009/0073562 A1* | 3/2009 | Tsubaki et al. | 359/557 |
| 2010/0134887 A1* | 6/2010 | Shin | 359/557 |

FOREIGN PATENT DOCUMENTS

JP 07-274056 A 10/1995

* cited by examiner

*Primary Examiner* — Kimberly N Kakalec
(74) *Attorney, Agent, or Firm* — Michael Best & Friedrich LLP

(57) ABSTRACT

Provided is an image blur correction apparatus including a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to turnably support the lens unit in the first direction and the second direction, a first drive unit configured to turn the lens unit in the first direction, and a second drive unit configured to turn the lens unit in the second direction.

23 Claims, 18 Drawing Sheets

20B ··· IMAGE BLUR CORRECTION APPARATUS
21 ··· LENS UNIT
21a ··· FIRST TURNING SHAFT
21b ··· FIRST SUPPORT GROOVE
22 ··· FIXED MEMBER
22a ··· SECOND TURNING SHAFT
22b ··· SECOND SUPPORT GROOVE
22c ··· REGULATING WALL PORTION
30 ··· FIRST DRIVE UNIT
31 ··· SECOND DRIVE UNIT
33 ··· BEARING MEMBER
33a ··· SLANTED FACE

1 · · · IMAGING APPARATUS
2 · · · OUTER HOUSING
20 · · · IMAGE BLUR CORRECTION APPARATUS
21 · · · LENS UNIT

1 · · · · IMAGING APPARATUS
2 · · · OUTER HOUSING

| 20 | ··· | IMAGE BLUR CORRECTION APPARATUS |
| 21 | ··· | LENS UNIT |
| 21a | ··· | FIRST TURNING SHAFT |
| 22 | ··· | FIXED MEMBER |
| 22a | ··· | SECOND TURNING SHAFT |
| 22b | ··· | SECOND SUPPORT GROOVE |
| 22c | ··· | REGULATING WALL PORTION |

| 20 | ··· | IMAGE BLUR CORRECTION APPARATUS |
|---|---|---|
| 21 | ··· | LENS UNIT |
| 21a | ··· | FIRST TURNING SHAFT |
| 21b | ··· | FIRST SUPPORT GROOVE |
| 22 | ··· | FIXED MEMBER |
| 22a | ··· | SECOND TURNING SHAFT |
| 22b | ··· | SECOND SUPPORT GROOVE |
| 22c | ··· | REGULATING WALL PORTION |
| 30 | ··· | FIRST DRIVE UNIT |
| 31 | ··· | SECOND DRIVE UNIT |

| 20 | ··· IMAGE BLUR CORRECTION APPARATUS |
|---|---|
| 21 | ··· LENS UNIT |
| 21a | ··· FIRST TURNING SHAFT |
| 21b | ··· FIRST SUPPORT GROOVE |
| 22 | ··· FIXED MEMBER |
| 22a | ··· SECOND TURNING SHAFT |
| 22b | ··· SECOND SUPPORT GROOVE |
| 22c | ··· REGULATING WALL PORTION |
| 30 | ··· FIRST DRIVE UNIT |
| 31 | ··· SECOND DRIVE UNIT |

| | | |
|---|---|---|
| 20 | ... | IMAGE BLUR CORRECTION APPARATUS |
| 21 | ... | LENS UNIT |
| 21a | ... | FIRST TURNING SHAFT |
| 22 | ... | FIXED MEMBER |
| 22a | ... | SECOND TURNING SHAFT |
| 22c | ... | REGULATING WALL PORTION |

20 ··· IMAGE BLUR CORRECTION APPARATUS
21 ··· LENS UNIT
21a ··· FIRST TURNING SHAFT
22 ··· FIXED MEMBER
22a ··· SECOND TURNING SHAFT
22c ··· REGULATING WALL PORTION

- 20 ··· IMAGE BLUR CORRECTION APPARATUS
- 21 ··· LENS UNIT
- 21a ··· FIRST TURNING SHAFT
- 22 ··· FIXED MEMBER
- 22a ··· SECOND TURNING SHAFT
- 22c ··· REGULATING WALL PORTION

20 ··· IMAGE BLUR CORRECTION APPARATUS
21 ··· LENS UNIT
21a ··· FIRST TURNING SHAFT
22 ··· FIXED MEMBER
22a ··· SECOND TURNING SHAFT
22c ··· REGULATING WALL PORTION

20A · · · IMAGE BLUR CORRECTION APPARATUS
21 · · · LENS UNIT
21a · · · FIRST TURNING SHAFT
22 · · · FIXED MEMBER
22a · · · SECOND TURNING SHAFT
32 · · · SPRING MEMBER

20A ··· IMAGE BLUR CORRECTION APPARATUS
21 ··· LENS UNIT
21a ··· FIRST TURNING SHAFT
22 ··· FIXED MEMBER
22a ··· SECOND TURNING SHAFT
32 ··· SPRING MEMBER

20B ··· IMAGE BLUR CORRECTION APPARATUS
21 ··· LENS UNIT
21a ··· FIRST TURNING SHAFT
22 ··· FIXED MEMBER
22a ··· SECOND TURNING SHAFT
22b ··· SECOND SUPPORT GROOVE
22c ··· REGULATING WALL PORTION
33 ··· BEARING MEMBER
33a ··· SLANTED FACE

- 20B ··· IMAGE BLUR CORRECTION APPARATUS
- 21 ··· LENS UNIT
- 21a ··· FIRST TURNING SHAFT
- 21b ··· FIRST SUPPORT GROOVE
- 22 ··· FIXED MEMBER
- 22a ··· SECOND TURNING SHAFT
- 22b ··· SECOND SUPPORT GROOVE
- 22c ··· REGULATING WALL PORTION
- 30 ··· FIRST DRIVE UNIT
- 31 ··· SECOND DRIVE UNIT
- 33 ··· BEARING MEMBER
- 33a ··· SLANTED FACE

20B ··· IMAGE BLUR CORRECTION APPARATUS
33  ··· BEARING MEMBER
33a ··· SLANTED FACE

20C · · · IMAGE BLUR CORRECTION APPARATUS
21C · · · LENS UNIT
22C · · · FIXED MEMBER
22a · · · SECOND TURNING SHAFT
22b · · · SECOND SUPPORT GROOVE
22c · · · REGULATING WALL PORTION
34 · · · MAIN BODY
35 · · · SUPPORT MEMBER
35a · · · FIRST TURNING SHAFT
36 · · · TURNING ACTUATOR

22C · · · FIXED MEMBER
22a · · · SECOND TURNING SHAFT
22b · · · SECOND SUPPORT GROOVE
22c · · · REGULATING WALL PORTION
33 · · · BEARING MEMBER
33a · · · SLANTED FACE
35 · · · SUPPORT MEMBER
35a · · · FIRST TURNING SHAFT
35b · · · FIRST SUPPORT GROOVE

IMAGE BLUR CORRECTION APPARATUS AND IMAGING APPARATUS

BACKGROUND

The present technology relates to a technical field regarding image blur correction apparatuses and imaging apparatuses. More specifically, the present technology relates to a technical field for making the configuration simpler and more compact by providing a first turning shaft and a second turning shaft on a lens unit and a fixed member, respectively, and forming a first support groove that supports a second turning shaft and a first support groove that supports a first turning shaft on a lens unit, respectively.

In an imaging apparatus such as a video camera and a still camera, an image blur correction apparatus may be provided for correcting image blur by moving a lens in a direction orthogonal to the light axis direction.

The image blur correction apparatus provided in such an imaging apparatus may be configured so that a lens unit, which has a lens, turns in a first direction about a first supporting axis that is orthogonal to the light axis of the lens with respect to an outer housing, and in a second direction that is a direction about a second supporting axis orthogonal to the light axis and the first supporting axis (e.g., refer to JP H7-274056A).

Image blur correction is performed by the lens unit being turned in a yaw direction about the first supporting axis, and in a pitch direction about the second supporting axis.

In the image blur correction apparatus described in JP H7-274056A, two gimbal mechanisms, each having a base plate curved in an L shape, are provided to turn the lens unit in the yaw direction and the pitch direction.

The image blur operation is carried out in the pitch direction by turning the lens unit in the pitch direction with respect to one of the gimbal mechanisms, and in the yaw direction by turning the lens unit together with the first gimbal mechanism in the yaw direction with respect to the other gimbal mechanism.

SUMMARY

However, in the image blur correction apparatus described in JP H7-274056A, two gimbal mechanisms are provided to turn the lens unit in the yaw direction and the pitch direction, so that the number of parts is unfortunately increased and the configuration becomes more complex by their presence.

Further, since a part of the two gimbal mechanisms overlap in the direction orthogonal to the light axis, the size in the direction orthogonal to the light axis is increased, which hinders making the apparatus more compact.

Accordingly, there is a need for an image blur correction apparatus and an imaging apparatus to make the configuration simpler and more compact.

According to a first embodiment of the present disclosure, there is provided an image blur correction apparatus including a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to turnably support the lens unit in the first direction and the second direction, a first drive unit configured to turn the lens unit in the first direction, and a second drive unit configured to turn the lens unit in the second direction. The lens unit is provided thereon with a first turning shaft that acts as a turning support in one of the first direction and the second direction, and whose center axis is in line with one of the first supporting axis and the second supporting axis. The fixed member is provided thereon a second turning shaft that acts as a turning support in another of the first direction and the second direction, and whose center axis is in line with another of the first supporting axis and the second supporting axis. A first support groove into which the second turning shaft is inserted, that acts as a bearing for the second turning shaft, and that extends in a light axis direction is formed on the lens unit. A second support groove into which the first turning shaft is inserted, that acts as a bearing for the first turning shaft, and that extends in the light axis direction is formed on the fixed member.

Therefore, in the blur correction apparatus, the lens unit is turned with respect to the fixed member in either the first direction or the second direction about the first turning shaft, and is turned in the other of the first direction or the second direction about the second first turning shaft.

As for the blur correction apparatus, it is preferable that a regulating portion may be provided that is configured to regulate movement of the lens unit in the light axis direction with respect to the fixed member.

By providing a regulating portion that regulates movement of the lens unit with respect to the fixed unit in the light axis direction, movement in the light axis direction when the lens unit is turned is regulated.

As for the blur correction apparatus, it is preferable that as the regulating portion, the fixed member may be provided thereon, as the regulating portion, an arc-shaped regulating wall portion along which a tip of the first turning shaft slides, and that is formed using, as a center, an intersection of the first supporting axis and the second supporting axis.

By providing on the fixed unit, as the regulating portion, an arc-shaped regulating wall portion along which a tip of the first turning shaft slides and that is formed around an intersection of the first supporting axis and the second supporting axis, the first turning shaft slides along the regulating wall portion, so that movement in the light axis direction when the lens unit is turned is regulated.

As for the blur correction apparatus, it is preferable that as the regulating portion, a spring member that is supported between the lens member and the fixed unit may be provided.

By providing, as the regulating portion, a spring member that is supported between the lens unit and the fixed member, the lens unit is held by a biasing force of the spring member, so that movement in the light axis direction when the lens unit is turned is regulated.

As for the blur correction apparatus, it is preferable that a bearing member may be provided that is rotatably supported by at least one of the first turning shaft and the second turning shaft, and that is inserted into the first support groove or the second support groove.

By providing a bearing member that is rotatably supported on at least the first turning shaft or the second turning shaft, and that is inserted into the first support groove or the second support groove, the bearing member is rotated when the lens unit is turned.

As for the blur correction apparatus, it is preferable that the bearing member may be supported by each of the first turning shaft and the second turning shaft.

By configuring so that a bearing member is supported on the first turning shaft and the second turning shaft, respectively, each bearing member is rotated with respect to the first turning shaft and the second turning shaft when the lens unit is turned in the first direction and the second direction.

As for the blur correction apparatus, it is preferable that an outer periphery of the bearing member may be formed as a slanted face. An extended line connecting an outer edge and an inner edge of the outer periphery in an axis direction of the bearing member may be in line with an intersection of a center axis of the first turning shaft and a center axis of the second turning shaft.

By configuring so that an outer periphery of the bearing member is formed as a slanted face, and an extended line connecting an outer edge and an inner edge of the outer periphery in an axis direction of the bearing member is in line with an intersection of a center axis of the first turning shaft and a center axis of the second turning shaft, the bearing members are rotated in response to the difference in the radius of rotation between the outer edge side and the inner edge side when the lens unit is rotated.

As for the blur correction apparatus, it is preferable that the first drive unit and the second drive unit may be provided on an outer face side of the lens unit in a light axis direction.

By providing the first drive unit and the second drive unit on an outer face side of the lens unit in the light axis direction, the first drive unit and the second drive unit are not present on the lens unit outer face side.

As for the blur correction apparatus, it is preferable that a main body configured to include the lens and a support member configured to turnably support the main body in a direction about the light axis may be provided on the lens unit. The first turning shaft may be provided on the support member, and the first support groove may be formed in the support member. The main body may be turnable in a direction about the light axis.

By providing in the lens unit a main body having a lens and a support member configured to turnably support the main body in the direction about the light axis, configuring so that the first turning shaft is provided on the support member and the first support groove is formed in the support member, and configuring so that the main body is capable of turning in the direction about the light axis, the main body is turned in the direction about the light axis with respect to the support member.

As for the blur correction apparatus, it is preferable that a turning actuator may be configured from the first drive unit and the second drive unit. The main body may be turned in the direction about the light axis by the turning actuator.

By configuring a turning actuator from the first drive unit and the second drive unit, and configuring so that the main body is turned in the direction about the light axis by the turning actuator, a dedicated drive unit for turning the main body in the direction about the light axis is not necessary.

According to an embodiment of the present disclosure, there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis. The image blur correction apparatus includes a fixed member configured to turnably support the lens unit in the first direction and the second direction, a first drive unit configured to turn the lens unit in the first direction, and a second drive unit configured to turn the lens unit in the second direction. The lens unit is provided thereon a first turning shaft that acts as a turning support in one of the first direction and the second direction, and whose center axis is in line with one of the first supporting axis and the second supporting axis. The fixed member is provided thereon a second turning shaft that acts as a turning support in another of the first direction and the second direction, and whose center axis is in line with another of the first supporting axis and the second supporting axis. A first support groove into which the second turning shaft is inserted, that acts as a bearing for the second turning shaft, and that extends in a light axis direction is formed on the lens unit. A second support groove into which the first turning shaft is inserted, that acts as a bearing for the first turning shaft, and that extends in the light axis direction is formed on the fixed member.

Therefore, for the imaging apparatus, in the blur correction apparatus, the lens unit is turned with respect to the fixed member in either the first direction or the second direction about the first turning shaft, and is turned in the other of the first direction and the second direction about the second first turning shaft.

According to a first embodiment of the present disclosure, there is provided an image blur correction apparatus including a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis, a fixed member configured to turnably support the lens unit in the first direction and the second direction, a first drive unit configured to turn the lens unit in the first direction, and a second drive unit configured to turn the lens unit in the second direction. The lens unit is provided thereon with a first turning shaft that acts as a turning support in one of the first direction and the second direction, and whose center axis is in line with one of the first supporting axis and the second supporting axis. The fixed member is provided thereon a second turning shaft that acts as a turning support in another of the first direction and the second direction, and whose center axis is in line with another of the first supporting axis and the second supporting axis. A first support groove into which the second turning shaft is inserted, that acts as a bearing for the second turning shaft, and that extends in a light axis direction is formed on the lens unit. A second support groove into which the first turning shaft is inserted, that acts as a bearing for the first turning shaft, and that extends in the light axis direction is formed on the fixed member.

Therefore, since the blur correction operation is carried out in the first direction and the second direction by supporting the lens unit on the fixed member, the number of parts is reduced, the size in the direction orthogonal to the light axis is reduced, and the configuration can be made simpler and more compact.

According to a second embodiment of the present disclosure, a regulating portion may be provided that is configured to regulate movement of the lens unit in the light axis direction with respect to the fixed member.

Therefore, the movement of the lens unit in the light axis direction is regulated, so that a more appropriate blur correction operation can be carried out.

According to a third embodiment of the present disclosure, as the regulating portion, the fixed member may be provided thereon, as the regulating portion, an arc-shaped regulating wall portion along which a tip of the first turning shaft slides, and that is formed using, as a center, an intersection of the first supporting axis and the second supporting axis.

Therefore, movement of the lens unit in the light axis direction can be reliably regulated by a simple configuration.

According to a fourth embodiment of the present disclosure, as the regulating portion, a spring member that is supported between the lens member and the fixed unit may be provided.

Therefore, since movement of the lens unit in the light axis direction is reliably regulated by the spring member, movement of the lens unit in the light axis direction can be reliably regulated by a simple configuration.

According to a fifth embodiment of the present disclosure, a bearing member may be provided that is rotatably supported by at least one of the first turning shaft and the second turning shaft, and that is inserted into the first support groove or the second support groove.

Therefore, the bearing members are rotated when the lens unit turns, so that a smooth blur correction operation can be carried out, the drive force of the first drive unit and the second drive unit can be reduced, and the apparatus can be made more compact.

According to a sixth embodiment of the present disclosure, the bearing member may be supported by each of the first turning shaft and the second turning shaft.

Therefore, a much smoother blur correction operation can be carried out, the drive force of the first drive unit and the second drive unit can be substantially reduced, and the apparatus can be made much more compact.

According to a seventh embodiment of the present disclosure, an outer periphery of the bearing member may be formed as a slanted face. An extended line connecting an outer edge and an inner edge of the outer periphery in an axis direction of the bearing member may be in line with an intersection of a center axis of the first turning shaft and a center axis of the second turning shaft.

Therefore, the bearing members are rotated in response to the difference in the radius of rotation between the outer edge side and the inner edge side when the lens unit is rotated, so that a loss in the rotation of the bearing members does not occur, and a smooth blur correction operation can be carried out.

According to an eighth embodiment of the present disclosure, the first drive unit and the second drive unit may be provided on an outer face side of the lens unit in a light axis direction.

Therefore, the image blur correction apparatus can be made more compact in the direction orthogonal to the light axis.

According to a ninth embodiment of the present disclosure, a main body configured to include the lens and a support member configured to turnably support the main body in a direction about the light axis may be provided on the lens unit. The first turning shaft may be provided on the support member, and the first support groove may be formed in the support member. The main body may be turnable in a direction about the light axis.

Therefore, the lens unit can also be turned in the direction about the light axis, so that a blur correction operation can also be performed in the direction about the light axis, thereby enabling a substantial improvement in image quality to be achieved.

According to an embodiment of the present disclosure, a turning actuator may be configured from the first drive unit and the second drive unit. The main body may be turned in the direction about the light axis by the turning actuator.

Therefore, a dedicated drive unit for turning the main body unit in the direction about the light axis is not necessary, so that the configuration of the lens unit can be made simpler and more compact due to a reduction in the number of parts and necessary space.

According to an embodiment of the present disclosure, there is provided an imaging apparatus including an image blur correction apparatus configured to include a lens unit that includes at least one lens and an outer housing that has the lens unit arranged therein. The lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis. The image blur correction apparatus includes a fixed member configured to turnably support the lens unit in the first direction and the second direction, a first drive unit configured to turn the lens unit in the first direction, and a second drive unit configured to turn the lens unit in the second direction. The lens unit is provided thereon a first turning shaft that acts as a turning support in one of the first direction and the second direction, and whose center axis is in line with one of the first supporting axis and the second supporting axis. The fixed member is provided thereon a second turning shaft that acts as a turning support in another of the first direction and the second direction, and whose center axis is in line with another of the first supporting axis and the second supporting axis. A first support groove into which the second turning shaft is inserted, that acts as a bearing for the second turning shaft, and that extends in a light axis direction is formed on the lens unit. A second support groove into which the first turning shaft is inserted, that acts as a bearing for the first turning shaft, and that extends in the light axis direction is formed on the fixed member.

Therefore, in the image blur correction apparatus, since the blur correction operation is carried out in the first direction and the second direction by supporting the lens unit on the fixed member, the number of parts is reduced, the size in the direction orthogonal to the light axis is reduced, and the configuration can be made more simple and more compact.

DETAILED DESCRIPTION OF THE EMBODIMENT(S)

Figure 1:
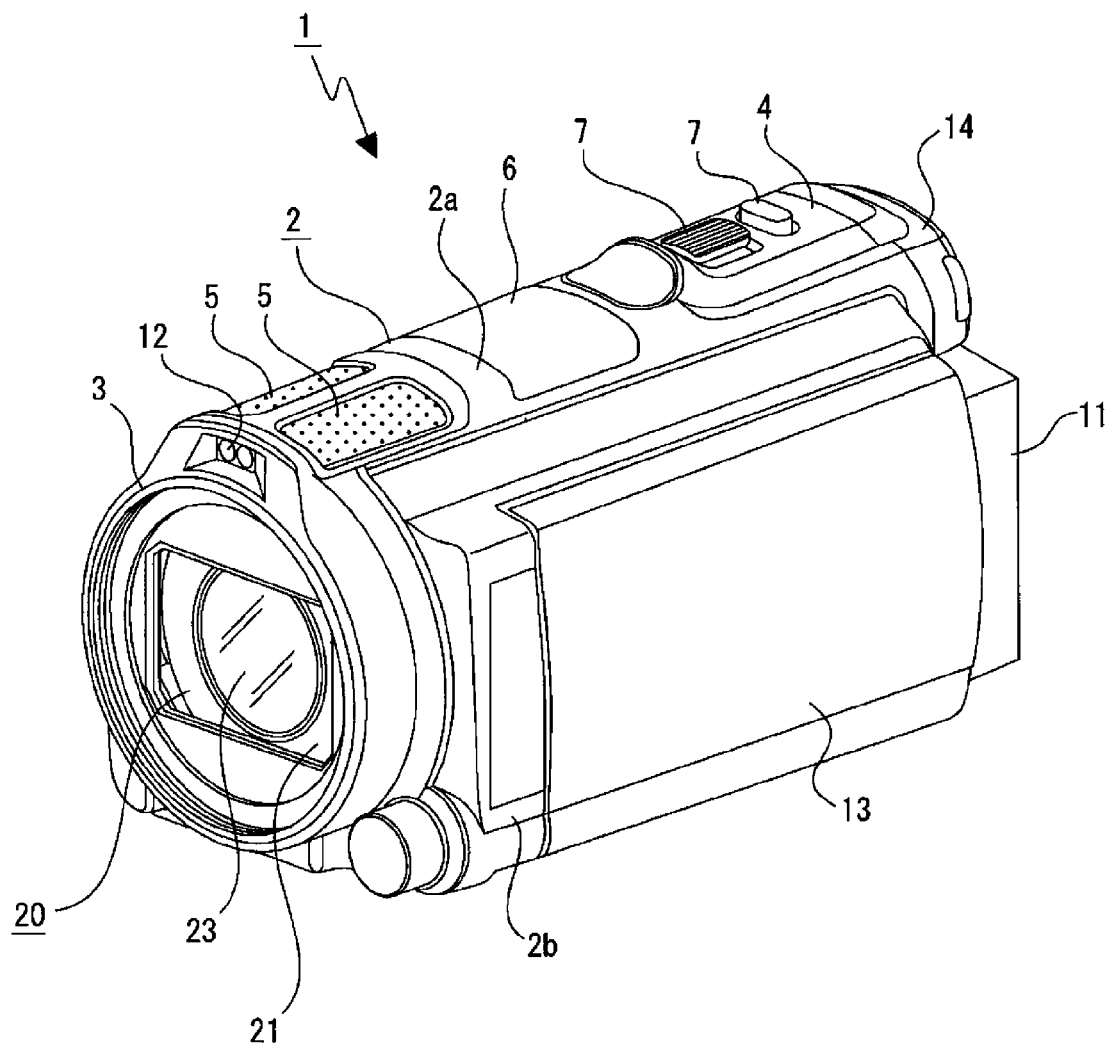
FIG. 1, which along with FIGS. 2 to 18 illustrates an image blur correction apparatus and an imaging apparatus according to an embodiment of the present technology, is a perspective view of an imaging apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A best mode for implementing out the image blur correction apparatus and imaging apparatus according to an embodiment of the present technology will now be described with reference to the attached drawings.

The below-illustrated best mode applies the imaging apparatus according to an embodiment of the present technology in a video camera, and applies the image blur correction apparatus according to an embodiment of the present technology as an image blur correction apparatus provided in this video camera.

The applicable scope of the imaging apparatus and image blur correction apparatus according to an embodiment of the present technology is not limited, respectively, to a video camera and an image blur correction apparatus provided in a video camera. The imaging apparatus and image blur correction apparatus according to an embodiment of the present technology can be widely applied as an imaging apparatus incorporated in various devices, for example, a still camera, a mobile telephones, a personal computer and the like, or as an image blur correction apparatus provided in such an imaging apparatus.

In the following description, the front/rear, up/down (hereinafter "vertical"), and left/right (hereinafter, "horizontal") directions represent the directions as seen by the photographer when capturing an image with the video camera. Therefore, the object side becomes the front, and the photographer's side becomes the rear.

It is noted that the front/rear, vertical, and horizontal directions mentioned below are to facilitate the description. The present technology is not limited to these directions.

Further, the lens illustrated below can mean either a lens configured from a single lens, or a lens that is configured as a lens group by a plurality of lenses.

[Overall Configuration of the Imaging Apparatus]

Figure 2:
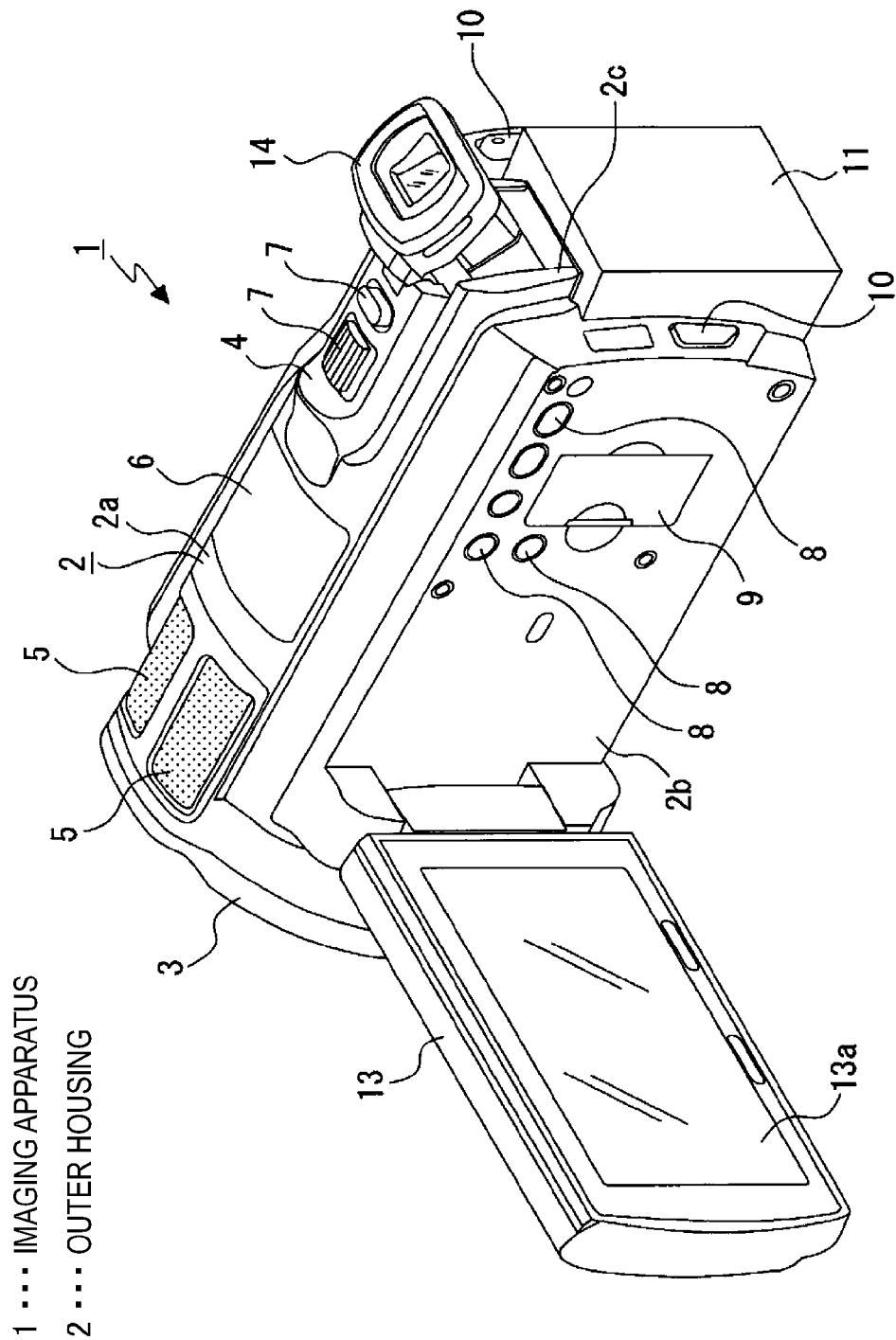
FIG. 2 is a perspective view of an imaging apparatus shown from a different direction from that in FIG. 1.
Figure 3:
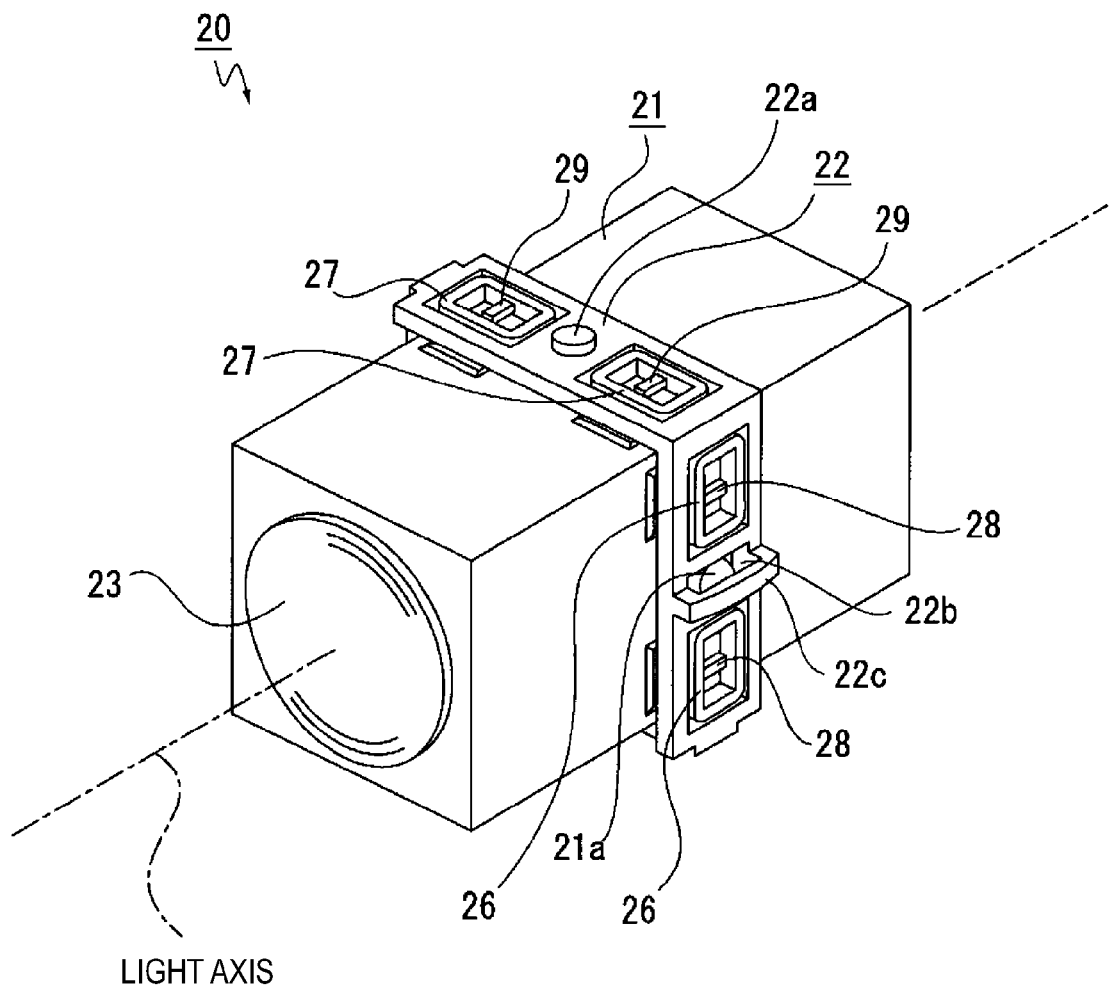
FIG. 3, which along with FIGS. 3 to 14 illustrates an image blur correction apparatus according to a first embodiment of the present technology, is a perspective view of an image blur correction apparatus.
Figure 4:
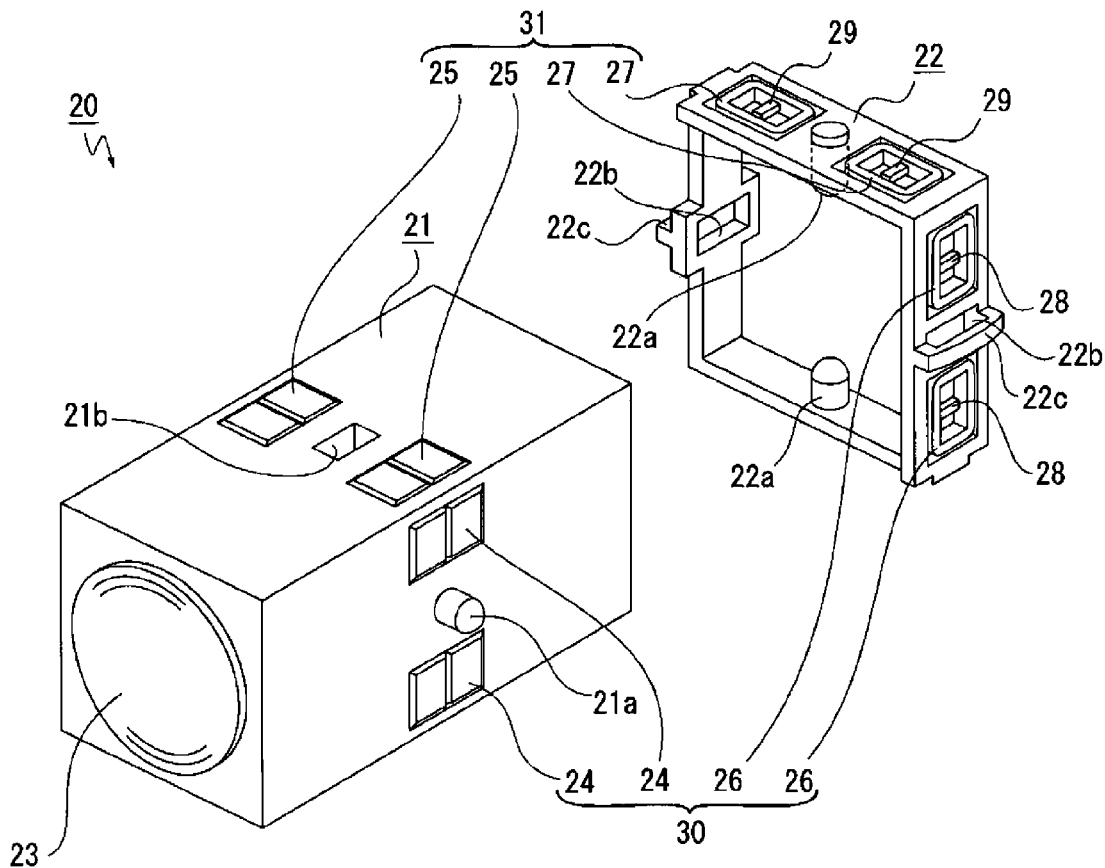
FIG. 4 is an exploded perspective view of an image blur correction apparatus.

An imaging apparatus 1 has various parts arranged in and externally to an outer housing 2 (refer to FIGS. 1 and 2). The outer housing 2 is formed in the shape of a casing that is long in the front/rear direction. A front edge portion is provided as a front panel 3, and an upper edge portion at a rear edge portion is provided as a storage case portion 4 that is open to the rear.

Microphones 5 and 5, an interface cover 6, and operating switches 7 and 7 are arranged in order from the front on an upper face 2a of the outer housing 2. The operating switches 7 and 7 are, for example, a zoom lever and imaging buttons.

Various operating buttons 8, 8 . . . , such as a power button and an image playback button, are arranged on one side face 2b of the outer housing 2. A memory card 9 is mounted on one side face 2b of the outer housing 2.

Operating buttons 10 and 10, such as a mode switching button and a recording button, are arranged on a rear face 2c of the outer housing 2.

A battery 11 is mounted on the rear face of the outer housing 2. A part of the battery 11 protrudes towards the rear from the rear face 2c of the outer housing 2.

A flash 12 is arranged on an upper edge portion of the front panel 3. The flash 12, which is used when capturing images at night, irradiates auxiliary light 12 toward the front.

A display unit 13 is turnably and rotatably attached to a side face portion of the outer housing 2. The front edge portion of the display unit 13 is connected to the outer housing 2. The display unit 13 has a display face 13a.

A finder 14 is attached to a rear edge portion of the imaging apparatus 1. The finder 14 can slide in the front/rear direction and can be turned in a tilt direction with respect to the storage case portion 4.

The finder 14 can slide between a storage position, in which the section excluding the rear edge portion is stored in the storage case portion 4, and a pulled-out position, in which the finder 14 has been pulled out from the storage case portion 4. Further, the finder 14 can be turned in a tilt direction about the front edge portion at the pulled-out position.

[Configuration of the Image Blur Correction Apparatus (First Embodiment)]

An image blur correction apparatus 20 according to a first embodiment of the present technology will now be described (refer to FIGS. 1 to 9).

An image blur correction apparatus 20 is arranged in the outer housing 2 (refer to FIG. 1). The image blur correction apparatus 20 has a lens unit 21 and a fixed member 22 that supports the lens unit 21 (refer to FIGS. 3 to 5).

The lens unit 21 is formed in a shape that extends in a light axis direction, for example, a roughly rectangular shape. A plurality of lenses or a lens group arrayed in a light axis direction is provided in the lens unit 21. A lens 23, called a "front lens", is arranged at the front-most side (object side).

In the lens unit 21, first turning shafts 21a and 21a that protrude outwards are provided on the left and right faces, respectively, and first support grooves 21b and 21b that are open outwards are formed on the upper and lower faces, respectively. The first support grooves 21b and 21b are formed in a shape that extends in the front/rear direction.

In the lens unit 21, first drive magnets 24 and 24 are attached to one side face, and second drive magnets 25 and 25 are attached to the upper face, for example. The first drive magnets 24 and 24 are vertically positioned sandwiching a first turning shaft 21a, and are magnetized so that the N pole and the S pole are in the front/rear direction. The second drive magnets 28 and 28 are horizontally positioned sandwiching a first support groove 21b, and are magnetized so that the N pole and the S pole are in the front/rear direction.

The fixed member 22 is formed in a rectangular frame shape, for example. On the fixed member 22, second turning shafts 22*a* and 22*a* that protrude inwards are provided on the upper and lower face portions, respectively, and second support grooves 22*b* and 22*b* are formed on the left and right face portions passing horizontally therethrough, respectively. The second support grooves 22*b* and 22*b* are formed in a shape that extends in the front/rear direction.

On the fixed member 22, first drive coils 26 and 26 are attached to one side face portion, and second drive coils 27 and 27 are attached to an upper face portion, for example. The first drive coils 26 and 26 are vertically positioned sandwiching a second support groove 22*b*, and the second drive coils 27 and 27 are horizontally positioned sandwiching a first turning shaft 21*a*.

First detection units 28 and 28 are arranged in a center portion of the first drive coils 26 and 26, respectively, and second detection units 29 and 29 are arranged in a center portion of the second drive coils 27 and 27, respectively. As the first detection units 28 and 28 and the second detection units 29 and 29, a Hall element can be used, for example.

Regulating wall portions 22*c* and 22*c* that function as a regulating portion for regulating movement of the lens unit 21 in the light axis direction (front/rear direction) are provided on both the left and right face portions of the fixed member 22, respectively. The regulating wall portions 22*c* protrude outwards, and are formed in a convex arc shape jutting outwards.

In the thus-configured lens unit 21 and fixed member 22, the first turning shafts 21*a* and 21*a* of the lens unit 21 are respectively inserted into the second support grooves 22*b* and 22*b* of the fixed member 22, and the second turning shafts 22*a* and 22*a* of the fixed member 22 are respectively inserted into the first support grooves 21*b* and 21*b* of the lens unit 21, whereby the lens unit 21 is turnably supported on the fixed member 22. At this stage, since the second support grooves 22*b* and 22*b* and the first support grooves 21*b* and 21*b* are each formed in a shape extending in the front/rear direction, the first turning shafts 21*a* and 21*a* can slide along the second support grooves 22*b* and 22*b*, respectively, and the second turning shafts 22*a* and 22*a* can slide along the first support grooves 21*b* and 21*b*, respectively.

The lens unit 21 can be turned with respect to the fixed member 22 in a first direction (yaw direction) about the second turning shafts 22*a* and 22*a*, and can be turned in a second direction (pitch direction) about the first turning shafts 21*a* and 21*a*. An axis connecting the second turning shafts 22*a* and 22*a* is a first supporting axis P that is orthogonal to the light axis (refer to FIG. 5). The lens unit 21 is turned in the first direction, which is the direction about the first supporting axis P. Further, an axis connecting the first turning shafts 21*a* and 21*a* is a second supporting axis Q that is orthogonal to the light axis and to the first supporting axis P (refer to FIG. 5). The lens unit 21 is turned in the second direction, which is the direction about the second supporting axis Q.

Figure 5:
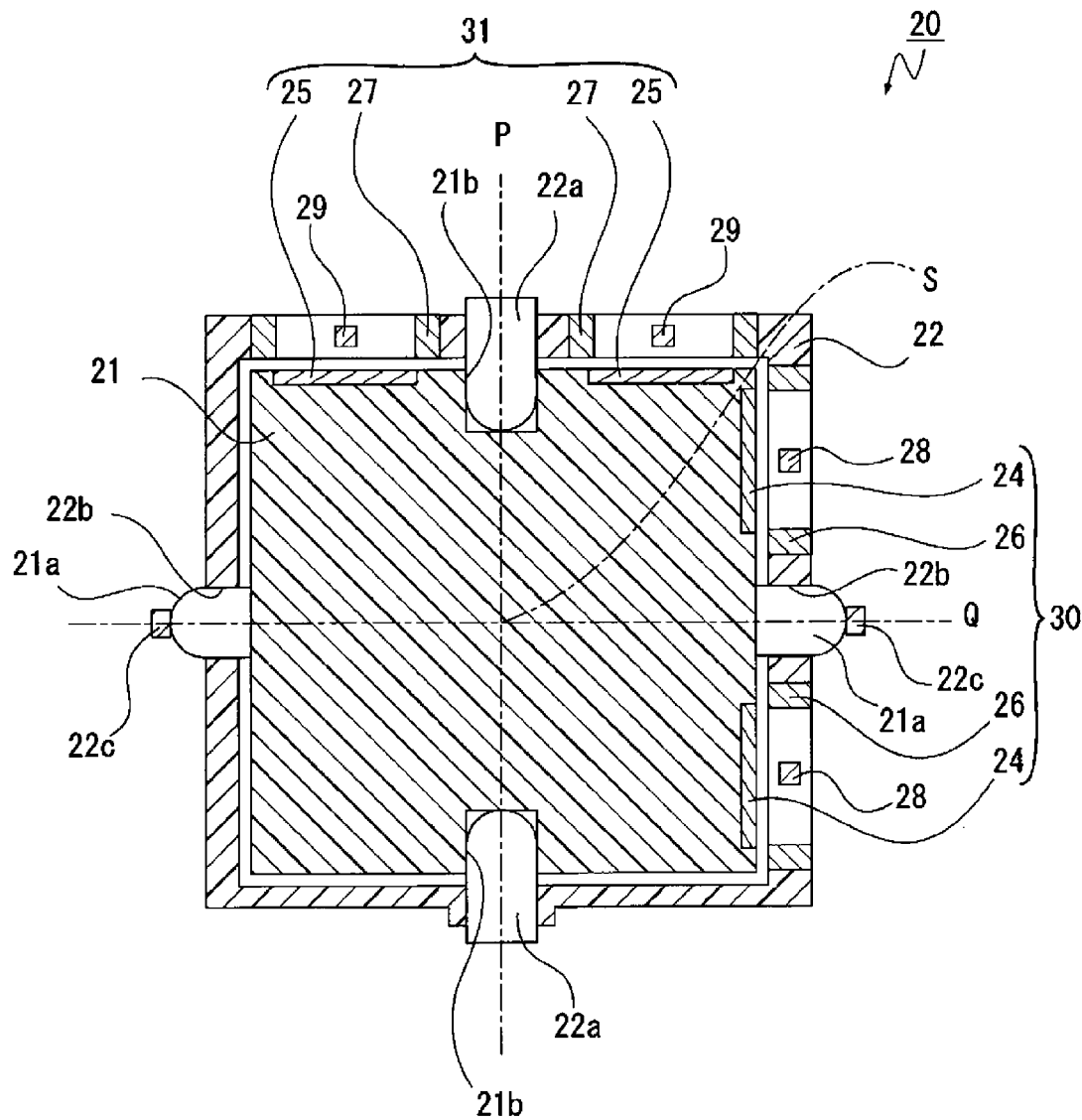
FIG. 5 is an enlarged cross-sectional view of an image blur correction apparatus.

The regulating wall portions 22*c* and 22*c* of the fixed member 22 are, as described above, formed in a convex arc shape jutting outwards, and are an arc shape formed around an intersection S of the first supporting axis P and the second supporting axis Q (refer to FIG. 5). Therefore, when the lens unit 21 turns in the first direction, the tip of the first turning shafts 21*a* and 21*a* slides along an inner face of the regulating wall portions 22*c* and 22*c*, respectively, so that the lens unit 21 does not move in the light axis direction with respect to the fixed member 22.

The first drive magnets 24 and 24 attached to the lens unit 21 and the first drive coils 26 and 26 attached to the fixed member 22 are respectively positioned facing the horizontal direction. A first drive unit 30 that turns the lens unit 21 in the first direction is configured from the first drive magnets 24 and 24 and the first drive coils 26 and 26. In the first drive unit 30, one of the first drive magnets 24 and one of the first drive coils 26 act as a first thrust generation unit that imparts on the lens unit 21*a* turning force (thrust) in the first direction. Further, the other first drive magnet 24 and the other first drive coil 26 also act as a first thrust generation unit that imparts on the lens unit 21*a* turning force (thrust) in the first direction.

On the other hand, the second drive magnets 25 and 25 attached to the lens unit 21 and the second drive coils 27 and 27 attached to the fixed member 22 are respectively positioned facing the vertical direction. A second drive unit 31 that turns the lens unit 21 in the second direction is configured from the second drive magnets 25 and 25 and the second drive coils 27 and 27. In the second drive unit 31, one of the second drive magnets 25 and one of the second drive coils 27 act as a second thrust generation unit that imparts on the lens unit 21*a* turning force (thrust) in the second direction. Further, the other second drive magnet 25 and the other second drive coil 27 also act as a second thrust generation unit that imparts on the lens unit 21*a* turning force (thrust) in the second direction.

It is noted that an example was described above in which the first drive unit 30 is configured on a side face portion of the lens unit 21 and the fixed member 22, and the second drive unit 31 is configured on the upper face portion of the lens unit 21 and the fixed member 22. However, conversely, the second drive unit for turning the lens unit 21 in the second direction may be configured on a side face portion of the lens unit 21 and the fixed member 22, and the first drive unit 31 for turning the lens unit 21 in the first direction may be configured on the upper face portion of the lens unit 21 and the fixed member 22.

Further, the first drive unit and the second drive unit may also be configured on the other side face portion or on the lower face side of the lens unit 21 and the fixed member 22.

In addition, an example was described above in which the second turning shafts 22*a* and 22*a* that function as a turning support in the first direction are provided on the fixed member 22, and the first turning shafts 21*a* and 21*a* that function as a turning support in the second direction are provided on the lens unit 21. However, conversely, the turning shafts that function as a turning support in the first direction may be provided on the lens unit, and the second turning shafts that function as a turning support in the second direction may be provided on the fixed member 22. In this case, the support grooves into which the turning shafts that function as a turning support in the first direction are inserted are formed on the fixed member, and the support grooves into which the turning shafts that function as a turning support in the second direction are inserted are formed on the lens unit.

Moreover, an example was described above in which the first drive magnets 24 and 24 and the second drive magnets 25 and 25 are arranged on the lens unit 21, and the first drive coils 26 and 26 and the second drive coils 27 and 27 are arranged on the fixed member 22. However, conversely, the drive coils may be arranged on the lens unit 21 and the magnets may be arranged on the fixed member 22.

[Operation of the Image Blur Correction Apparatus (First Embodiment)]

The blur correction operation performed in the image blur correction apparatus 20 will now be described (refer to FIGS. 6 to 9). It is noted that in FIGS. 6 to 9, (A) are plan views and (B) are side views.

Figure 6:
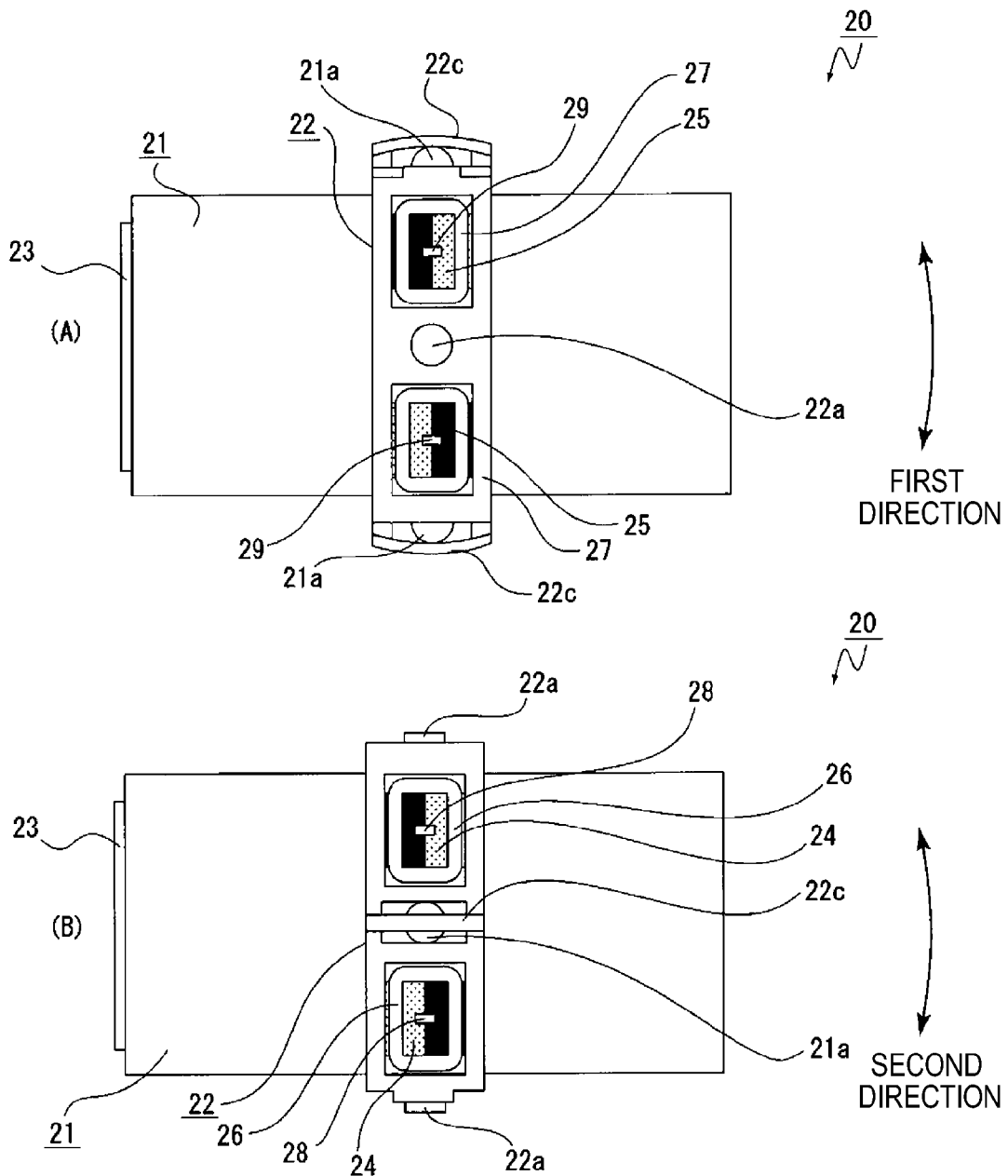
FIG. 6, which along with FIGS. 7 to 9 illustrates operation of an image blur correction apparatus, is a diagram illustrating a state in which a lens unit is at a reference position.

In a state before the blur correction operation is carried out, the image blur correction apparatus 20 is at a reference position where there has been no turning in the first direction or the second direction (refer to FIG. 6).

Figure 7:
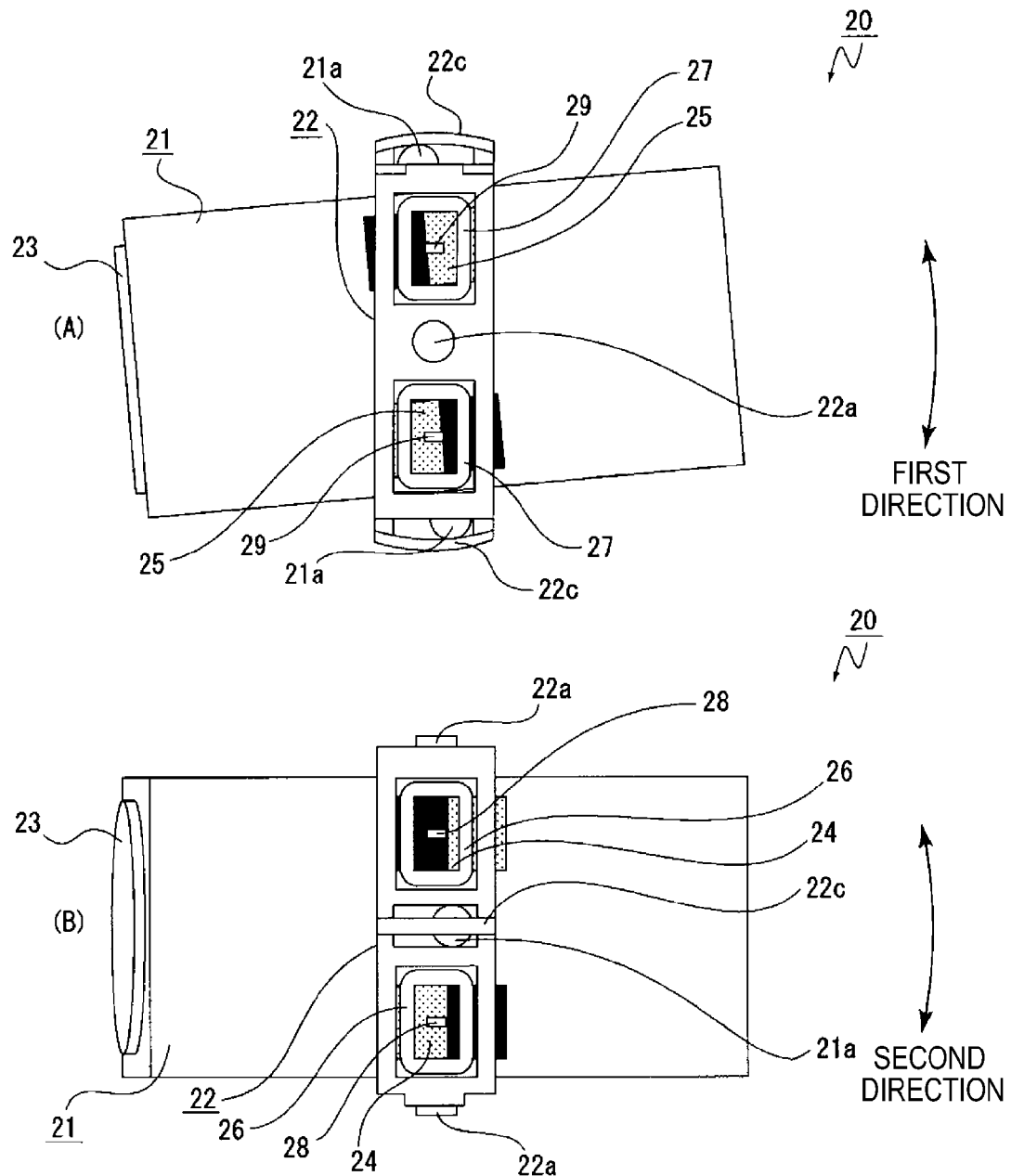
FIG. 7 is a diagram illustrating a state in which a lens unit has been turned in a first direction.

In the image blur correction apparatus 20, when power is supplied to the first drive coils 26 and 26 of the first drive unit 30 so that, for example, thrust is produced in the same direction, a blur correction operation is carried out by the lens unit 21 turning in the first direction about the first supporting axis P (refer to FIG. 7). At this stage, the blur correction operation of the lens unit 21 is smoothly carried out by the first turning shafts 21a and 21a sliding along the second support grooves 22b and 22b, respectively, without the first turning shafts 21a and 21a causing any hindrance in the turning of the lens unit 21.

Figure 8:
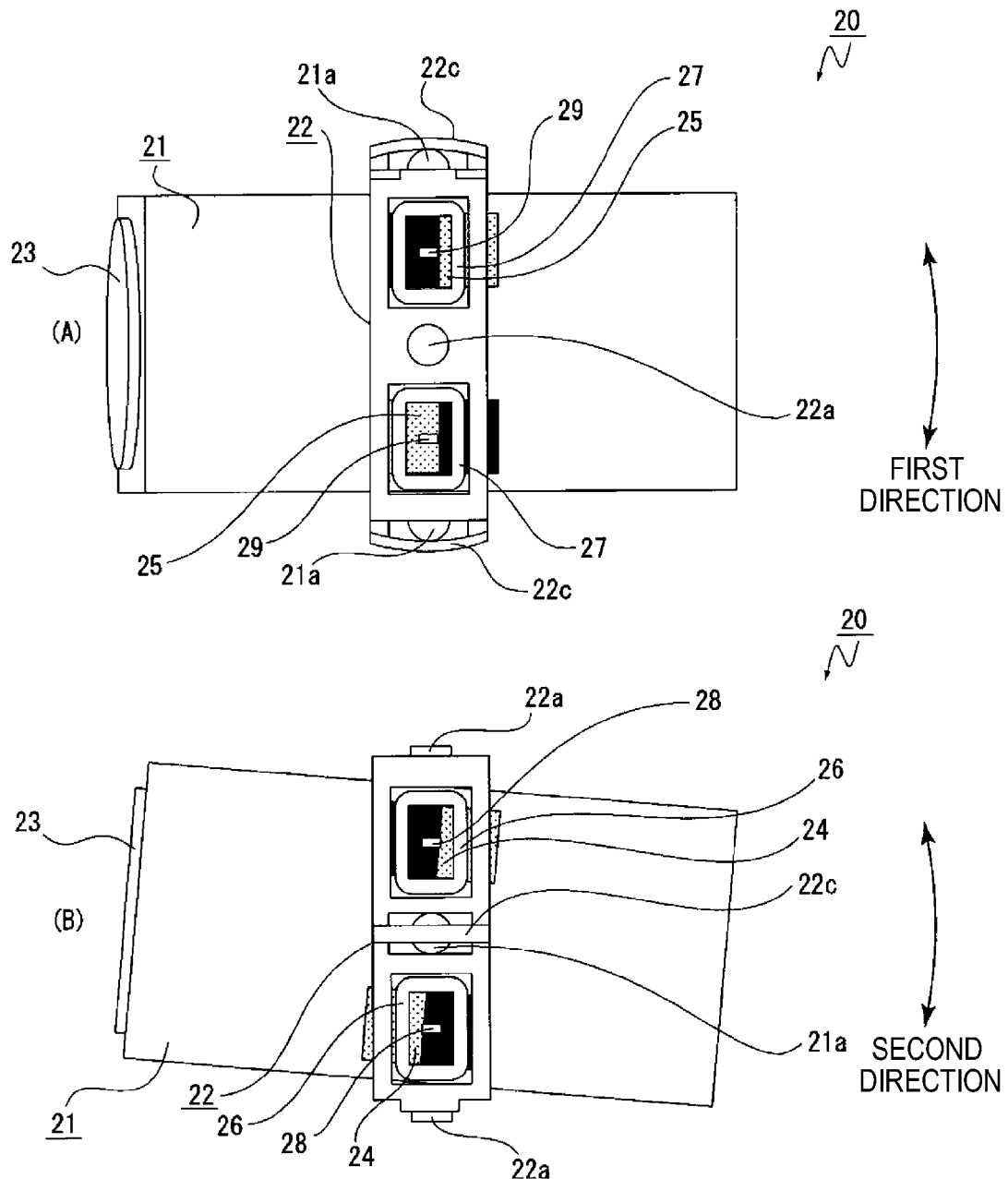
FIG. 8 is a diagram illustrating a state in which a lens unit has been turned in a second direction.

On the other hand, when power is supplied to the second drive coils 27 and 27 of the second drive unit 31 so that, for example, thrust is produced in the same direction, a blur correction operation is carried out by the lens unit 21 turning in the second direction about the second first supporting axis Q (refer to FIG. 8). At this stage, the blur correction operation of the lens unit 21 is smoothly carried out by the second turning shafts 22a and 22a sliding along the first support grooves 21b and 21b, respectively, without the second turning shafts 22a and 22a causing any hindrance in the turning of the lens unit 21.

Figure 9:
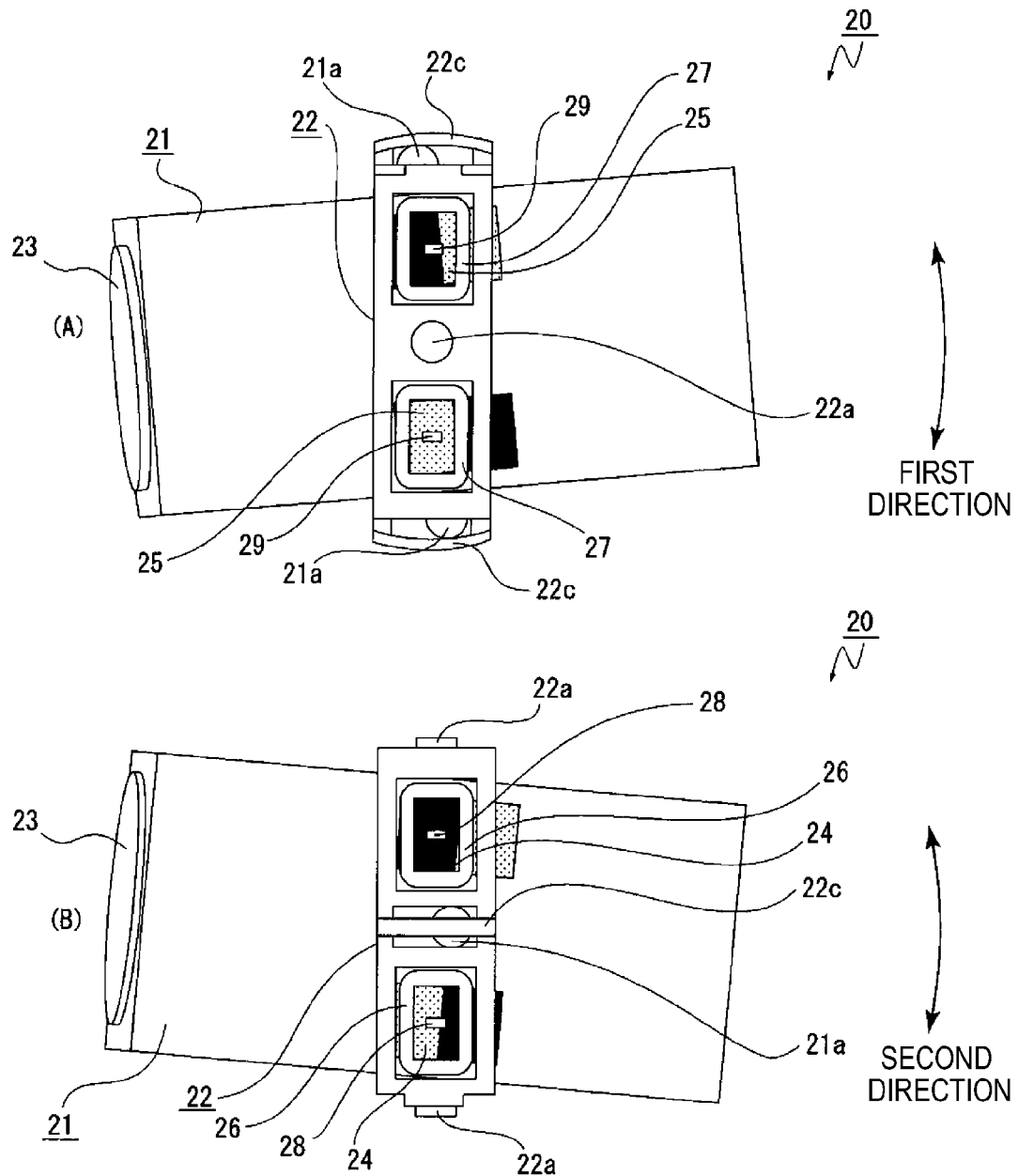
FIG. 9 is a diagram illustrating a state in which a lens unit has been turned in a first direction and a second direction.

Further, when the supply of power to the first drive coils 26 and 26 so that, for example, thrust is produced in the same direction, and the supply of power to the second drive coils 27 and 27 so that, for example, thrust is produced in the same direction, is carried out simultaneously, a blur correction operation is carried out by the lens unit 21 turning in the first direction about the first supporting axis P and the lens unit 21 turning in the second direction about the second first supporting axis Q (refer to FIG. 9). At this stage, the blur correction operation of the lens unit 21 is smoothly carried out by the first turning shafts 21a and 21a sliding along the second support grooves 22b and 22b, respectively, and the second turning shafts 22a and 22a sliding along the first support grooves 21b and 21b, respectively, without the first turning shafts 21a and 21a or the second turning shafts 22a and 22a causing any hindrance in the turning of the lens unit 21.

When the lens unit 21 turns in the first direction, the tip of the first turning shafts 21a and 21a slides along an inner face of the regulating wall portions 22c and 22c, respectively, so that the lens unit 21 does not move in the light axis direction with respect to the fixed member 22. Further, when the lens unit 21 turns in the second direction too, movement of the first turning shafts 21a and 21a in the light axis direction is regulated by the regulating wall portions 22c and 22c, respectively.

In the thus-configured image blur correction apparatus 20, since the regulating wall portions 22c and 22c are provided that regulate movement in the light axis direction of the lens unit 21 with respect to the fixed member 22, movement of the lens unit 21 in the light axis direction is regulated, so that a more appropriate blur correction operation can be carried out.

Further, since the regulating wall portions 22c and 22c are formed in an arc shape around the intersection S of the first supporting axis P and the second supporting axis Q, movement of the lens unit 21 in the light axis direction can be reliably regulated by a simple configuration.

During the above blur correction operation, the position of the lens unit 21 in the first direction is continuously detected by detecting changes in the magnetic field of the first drive magnets 24 and 24 with the first detection units 28 and 28, and the position of the lens unit 21 in the second direction is continuously detected by detecting changes in the magnetic field of the second drive magnets 25 and 25 with the second detection units 29 and 29.

[Modified Examples of the Image Blur Correction Apparatus]

Next, modified examples of the image blur correction apparatus according to the first embodiment of the present technology will now be described.

<First Modified Example>

Figure 10:
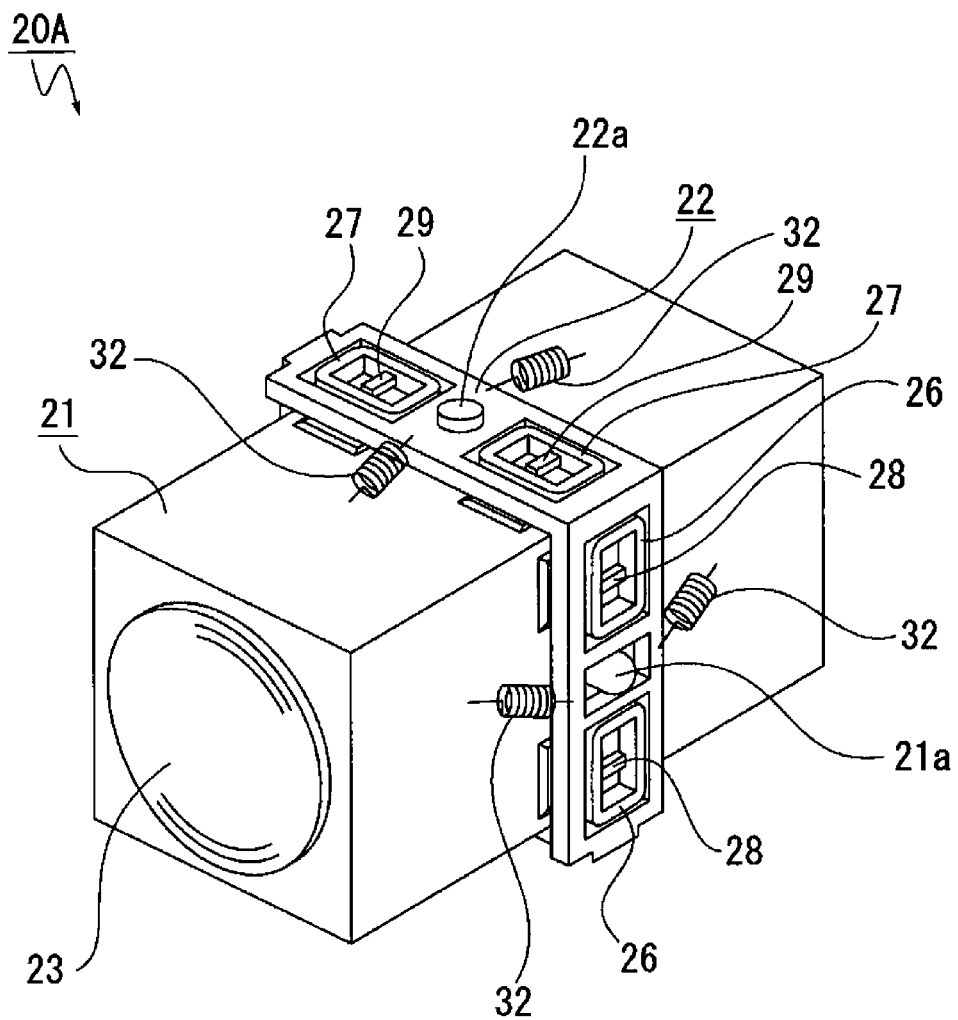
FIG. 10 is a perspective view of an image blur correction apparatus according to a first modified example.
Figure 11:
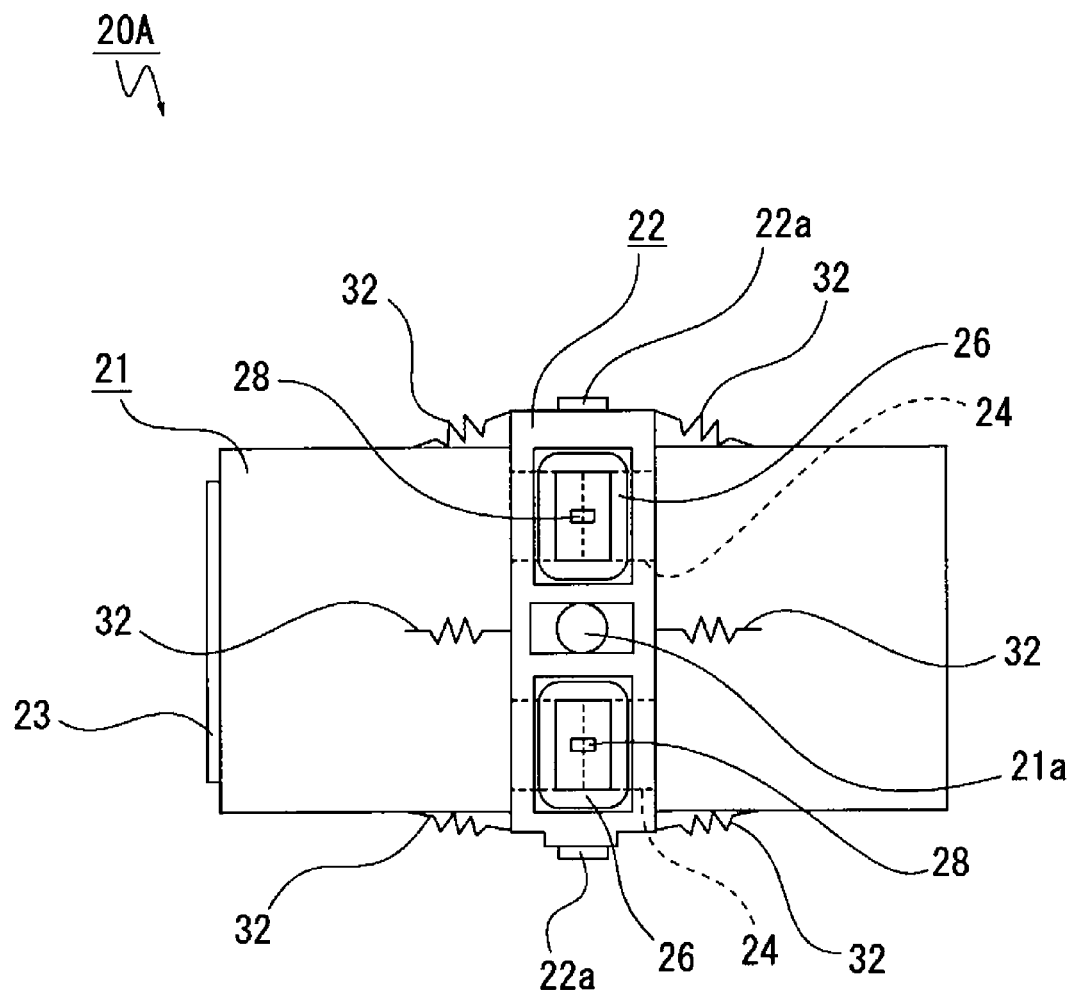
FIG. 11 is a side view of an image blur correction apparatus according to a first modified example.

First, an image blur correction apparatus 20A according to a first modified example will be described (refer to FIGS. 10 and 11).

It is noted that the image blur correction apparatus 20A illustrated below only differs from the above-described image blur correction apparatus 20 in that a spring member is provided. Therefore, only the parts that are different to the image blur correction apparatus 20 will be described in detail. The other parts are denoted using the same reference numerals as the similar parts in the image blur correction apparatus 20, and a description thereof is omitted.

The regulating wall portions 22c and 22c are not provided in the image blur correction apparatus 20A, instead, spring members 32, 32, . . . are provided as a regulating portion for regulating movement of the lens unit 21 in the light axis direction (front/rear direction).

The spring members 32, 32, . . . are, for example, an extension coil spring that are provided in the front and rear sandwiching the upper and lower faces and the left and right faces, respectively, of the fixed member 22, and are supported between the lens unit 21 and the fixed member 22. The lens unit 21 is biased and held so that the first turning shafts 21a and 21a and the second turning shafts 22a and 22a are positioned in a center portion in the front/rear direction of second support grooves 22b and 22b and the first support grooves 21b and 21b, respectively, by pairs of two spring members 32 and 32 positioned in front/behind each other.

In the thus-configured image blur correction apparatus 20A, since spring members 32, 32, . . . are provided that regulate movement in the light axis direction of the lens unit 21 with respect to the fixed member 22, movement of the lens unit 21 in the light axis direction is regulated, so that a more appropriate blur correction operation can be carried out.

Further, since movement of the lens unit 21 in the light axis direction is regulated due to the spring members 32, 32, . . . being supported between the lens unit 21 and the fixed member 22, movement of the lens unit 21 in the light axis direction can be reliably regulated by a simple configuration.

<Second Modified Example>

Figure 12:
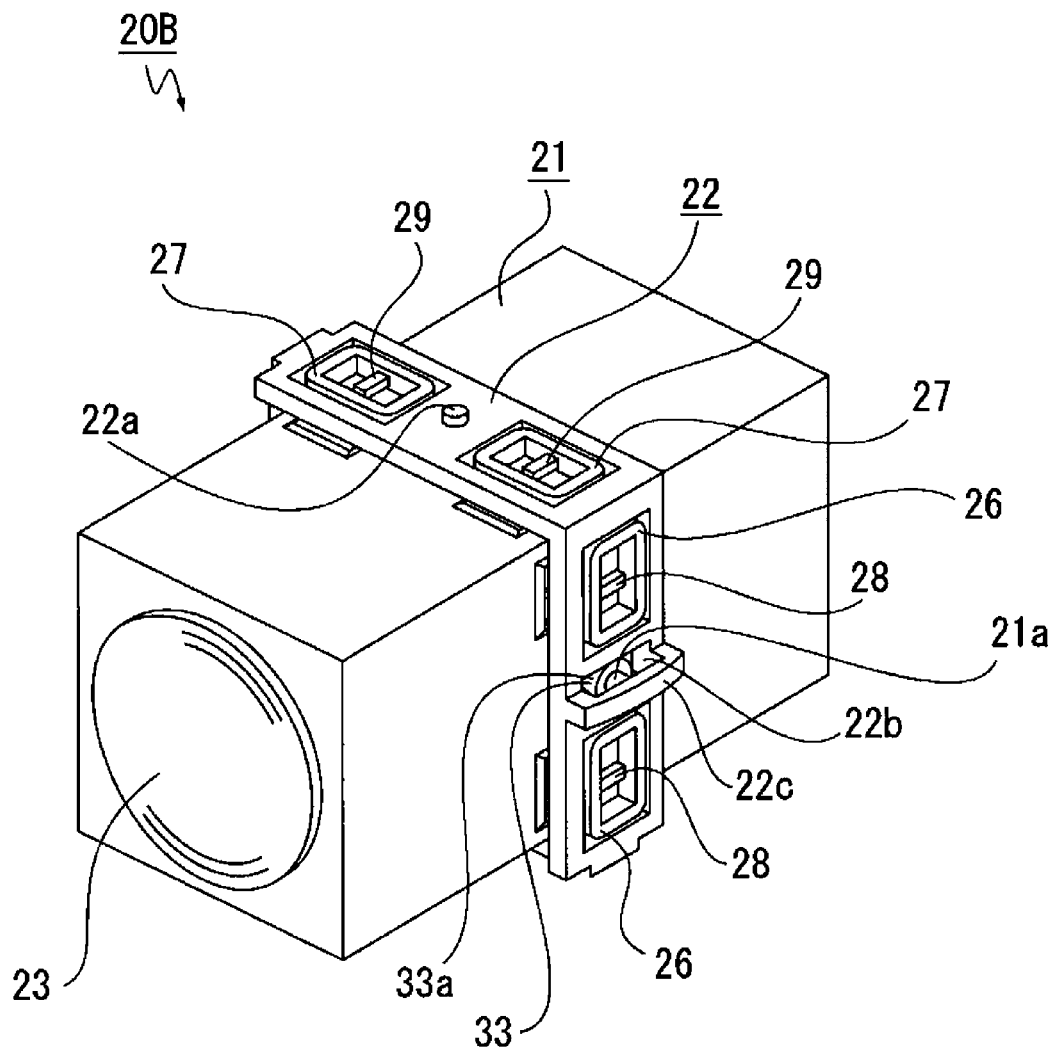
FIG. 12 is a perspective view of an image blur correction apparatus according to a second modified example.
Figure 13:
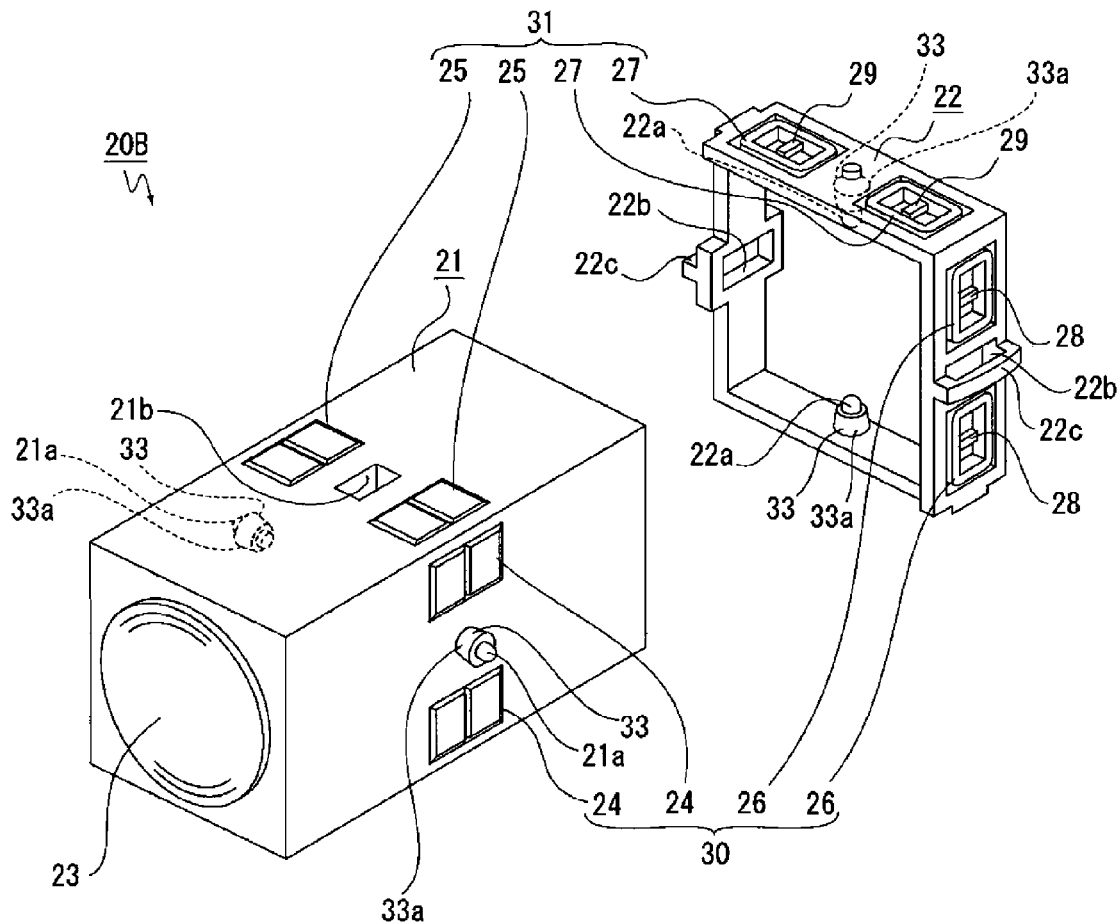
FIG. 13 is an exploded perspective view of an image blur correction apparatus according to a second modified example.
Figure 14:
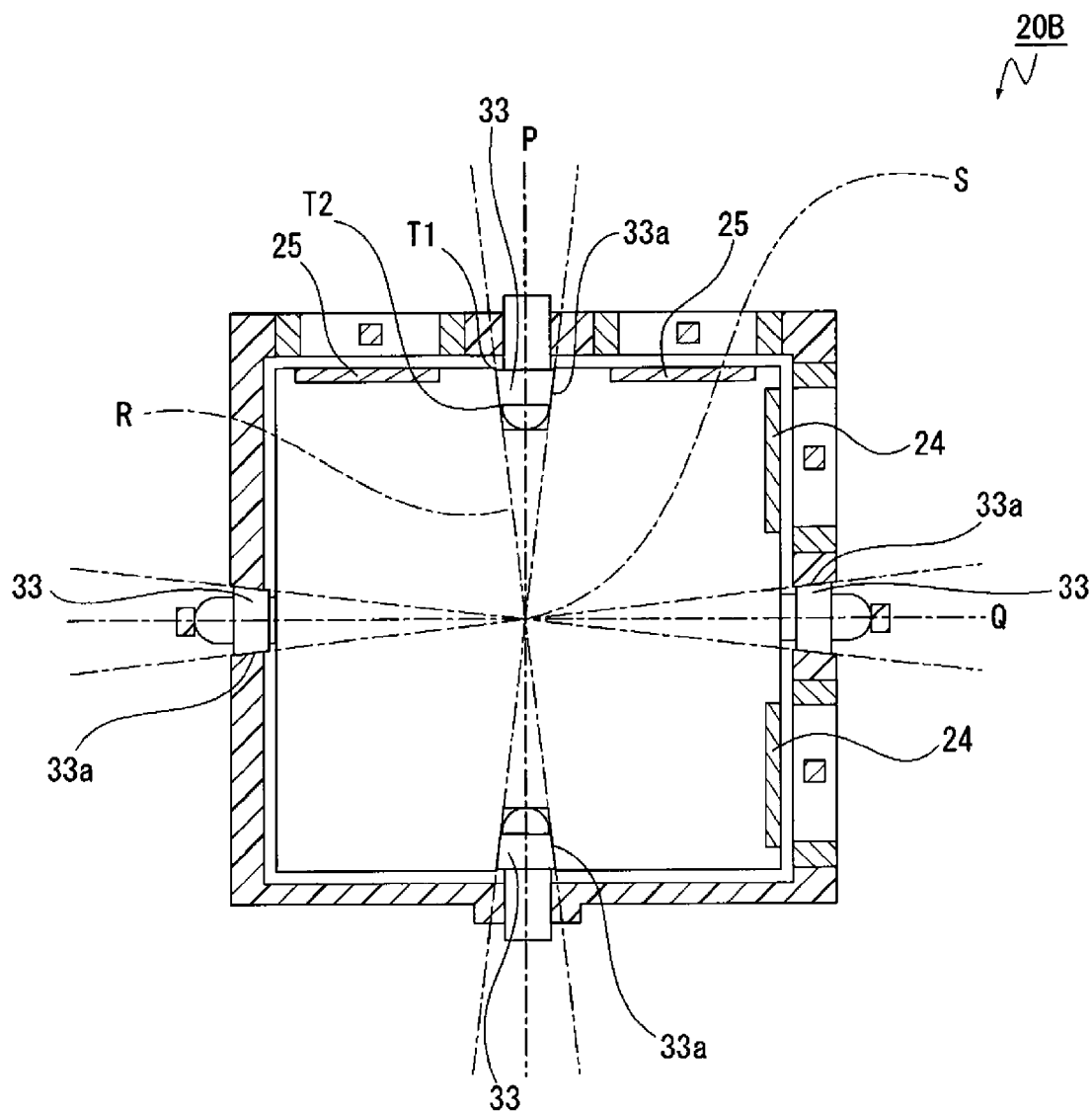
FIG. 14 is an enlarged cross-sectional view of an image blur correction apparatus according to a second modified example.

Next, an image blur correction apparatus 20B according to a second modified example of the first embodiment according to the present technology will be described (refer to FIGS. 12 to 14).

It is noted that the image blur correction apparatus 20B illustrated below only differs from the above-described image blur correction apparatus 20 in that a bearing member is provided. Therefore, only the parts that are different to the image blur correction apparatus 20 will be described in detail. The other parts are denoted using the same reference numerals as the similar parts in the image blur correction apparatus 20, and a description thereof is omitted.

Bearing members 33, 33, . . . are rotatably supported on the first turning shafts 21a and 21a of the lens unit 21 and the second turning shafts 22a and 22a of the fixed member 22 in the image blur correction apparatus 20B, respectively.

The outer periphery of the bearing members 33 is formed as a slanted face 33a. The slanted face 33a is formed so that an extended line R connecting an outer edge T1 and an inner edge T2 (refer to FIG. 14) in the axis direction of the bearing member 33 is in line with the intersection S of the first supporting axis P and the second supporting axis Q.

The bearing members 33, 33, ... are inserted into the first support grooves 21b and 21b of the lens unit 21 and the second support grooves 22b and 22b of the fixed member 22, respectively. The inner periphery of the first support grooves 21b and 21b and the second support grooves 22b and 22b are each formed with the same slanted face as the slanted faces 33a, 33a, ..., so that the slanted faces 33a, 33a, ... of the bearing members 33, 33, ... contact the respective inner periphery of the first support grooves 21b and 21b and the second support grooves 22b and 22b.

When the lens unit 21 has been turned in the first direction and the second direction, the bearing members 33, 33, ... are turned with respect to the first turning shafts 21a and 21a and the second turning shafts 22a and 22a, and can roll along the first support grooves 21b and 21b and the second support grooves 22b and 22b.

Thus, in the image blur correction apparatus 20B, the bearing members 33, 33, ... are rotatably supported on the first turning shafts 21a and 21a of the lens unit 21 and the second turning shafts 22a and 22a of the fixed member 22.

Therefore, since the bearing members 33 and 33 are rotated when the lens unit 21 turns in the first direction and the second direction, a smooth blur correction operation can be carried out, the drive force of the first drive unit 30 and the second drive unit 31 can be reduced, and the apparatus can be made more compact.

It is noted that the bearing members 33, 33, ... may be rotatably supported, for example, on either the first turning shafts 21a and 21a or the second turning shafts 22a and 22a. Even in such a case, the bearing members 33 and 33 are rotated when the lens unit 21 turns in the first direction and the second direction.

Therefore, a smooth blur correction operation can be carried out, the drive force of the first drive unit 30 and the second drive unit 31 can be reduced, and the apparatus can be made more compact.

Further, since the outer periphery of the bearing members 33 is formed as a slanted face 33a in which an extended line R connecting the outer edge T1 and the inner edge T2 is in line with the intersection S of the first supporting axis P and the second supporting axis Q, when the lens unit 21 is turned in the first direction or the second direction, the bearing members 33 are rotated in response to the difference in the radius of rotation of the outer edge side and the inner edge side.

Therefore, a loss in the rotation of the bearing members 33 does not occur, and a smooth blur correction operation can be carried out.

[Configuration of the Image Blur Correction Apparatus (Second Embodiment)]

An image blur correction apparatus 20C according to a second embodiment of the present technology will now be described (refer to FIGS. 15 to 17).

It is noted that the image blur correction apparatus 20C illustrated below only differs from the above-described image blur correction apparatus 20 in that, in addition to the first direction and the second direction, the lens unit can also be turned in a third direction. Therefore, regarding the image blur correction apparatus 20C, only the parts that are different to the image blur correction apparatus 20 will be described in detail. The other parts are denoted using the same reference numerals as the similar parts in the image blur correction apparatus 20, and a description thereof is omitted.

Figure 15:
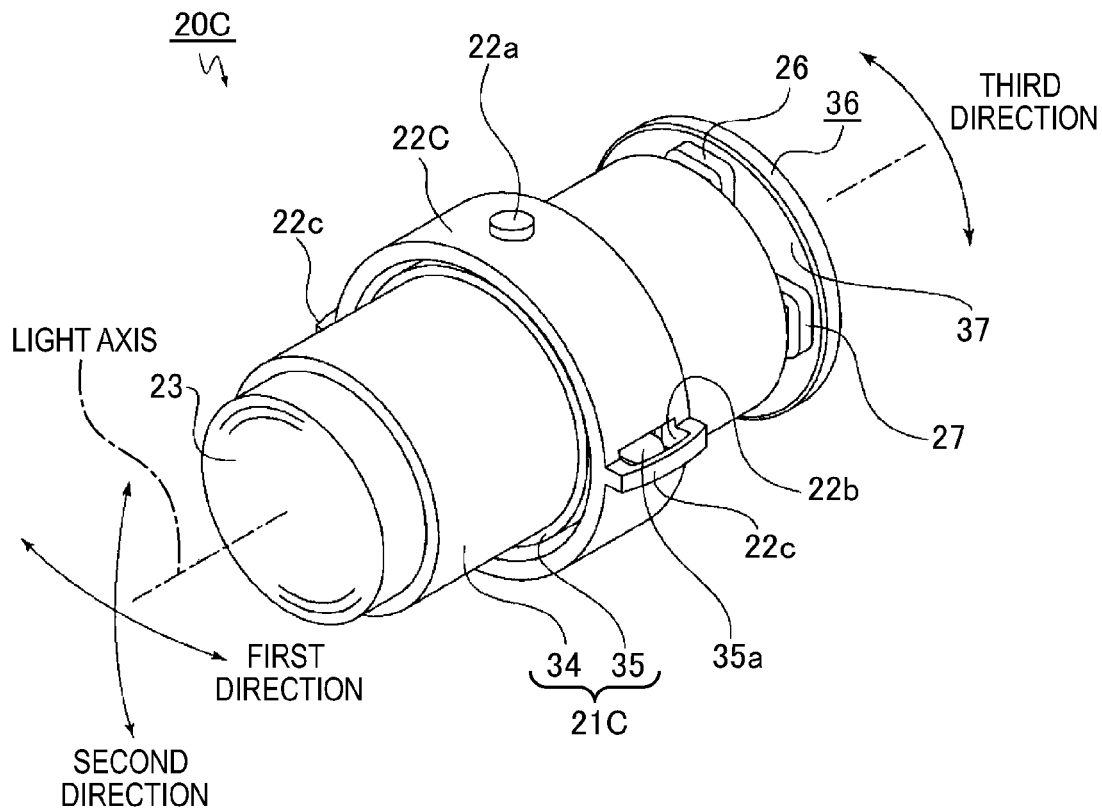
FIG. 15, which along with FIGS. 16 and 17 illustrates an image blur correction apparatus according to a second embodiment of the present technology, is a perspective view of an image blur correction apparatus.
Figure 16:
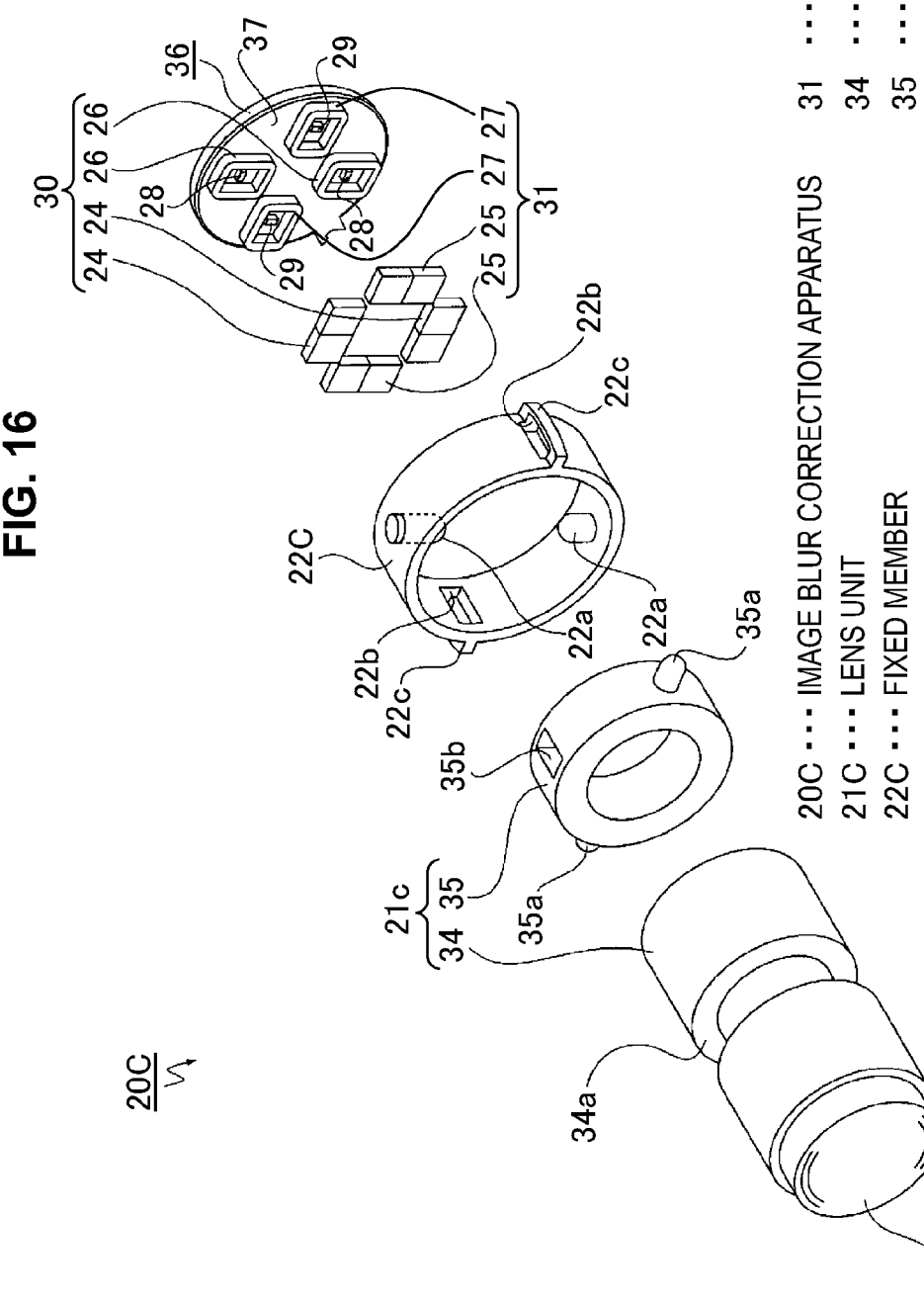
FIG. 16 is an exploded perspective view of an image blur correction apparatus.
Figure 17:
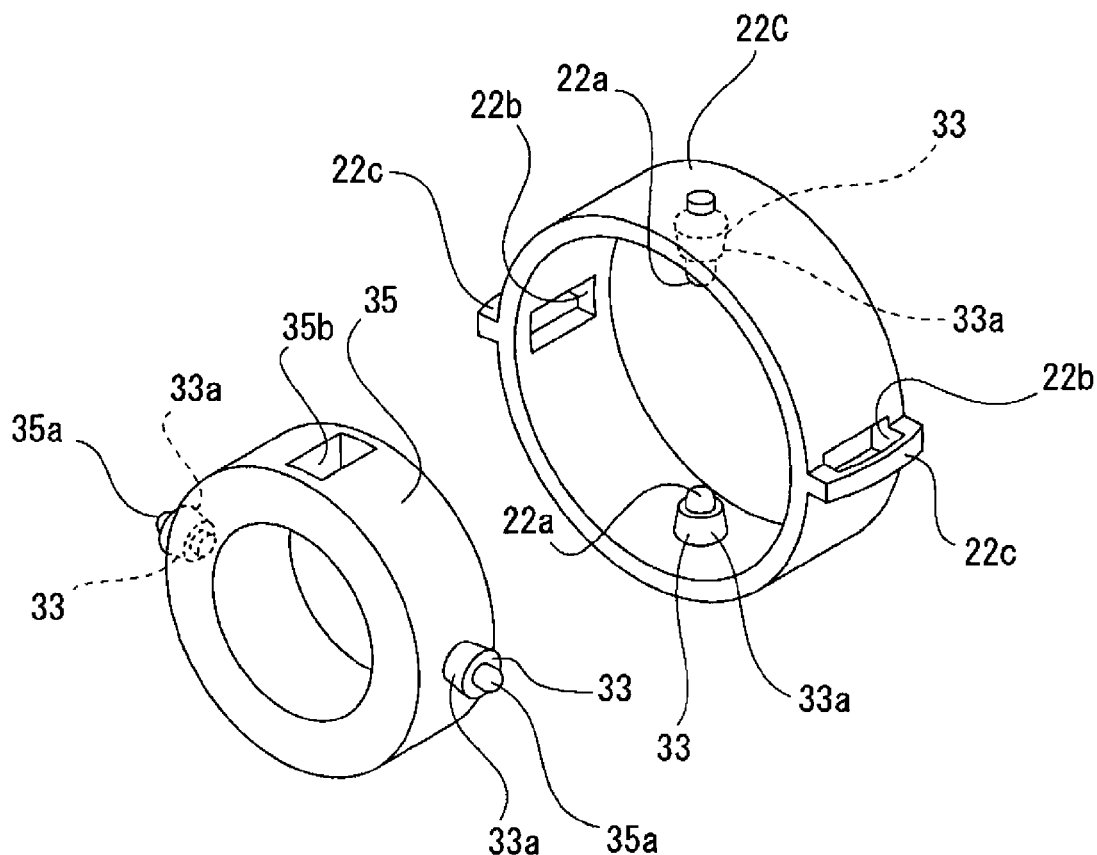
FIG. 17 is a perspective view of a support member and a fixed member illustrating an example in which a bearing member is provided in the image blur correction apparatus according to a second embodiment of the present technology.

The image blur correction apparatus 20C has a lens unit 21C and a fixed member 22C that supports the lens unit 21C (refer to FIGS. 15 and 16).

The lens unit 21C is formed in a shape that extends in a light axis direction, and is configured from a main body 34 provided with a plurality of lenses or a lens group that include an imaging lens 23, and a support member that rotatably supports the main body 34 in the direction around the light axis.

The main body 34 is formed in a roughly cylindrical shape, for example. A supported groove 34a that extends in a circumferential direction is formed on a roughly center portion in the front/rear direction on the main body 34. The supported groove 34a is supported by the support member 35. It is noted that the main body 34 may be formed in some other shape than a cylindrical shape, for example, in a rectangular shape.

First drive magnets 24 and 24 and second drive magnets 25 and 25 are attached to the rear face of the main body 34. The first drive magnets 24 and 24 are vertically positioned sandwiching the light axis, and are magnetized so that the N pole and the S pole are in the horizontal direction. The second drive magnets 25 and 25 are horizontally positioned sandwiching the light axis, and are magnetized so that the N pole and the S pole are in the vertical direction.

The support member 35 is formed in a roughly circular shape. On the support member 35, first turning shafts 35a and 35a that protrude outwards are provided on the left and right faces, respectively, and first support grooves 35b and 35b that are open outwards are provided on the upper and lower faces, respectively. The first support grooves 35b and 35b are formed in a shape that extends in the front/rear direction.

A fixed member 22C is formed in a roughly circular shape. The fixed member 22C is provided with second turning shafts 22a and 22a. On the fixed member 22C, second support grooves 22b and 22b are also formed. Further, regulating wall portions 22c and 22c are provided on the fixed member 22C.

A turning actuator 36 is arranged on a rear side face of the lens unit 21C. The turning actuator 36 is configured so as to include the first drive magnets 24 and 24 and the second drive magnets 25 and 25.

A circular substrate 37, for example, facing in the front/rear direction is provided on the turning actuator 36. First drive coils 26 and 26 and second drive coils 27 and 27 are attached to the front face of the substrate 37. The first drive coils 26 and 26 are vertically positioned sandwiching the light axis, and the second drive coils 27 and 27 are horizontally positioned sandwiching the light axis.

First detection units 28 and 28 are arranged in a center portion of the first drive coils 26 and 26, respectively, and second detection units 27 and 27 are arranged in a center portion of the second drive coils 29 and 29, respectively.

In the thus-configured lens unit 21C and fixed member 22C, the first turning shafts 35a and 35a of the lens unit 21C are inserted into the second support grooves 22b and 22b of the fixed member 22C, respectively, and the second turning shafts 22a and 22a of the fixed member 22C are inserted into the first support grooves 35b and 35b of the lens unit 21C, respectively, so that the lens unit 21C is turnably supported on the fixed member 22C. At this stage, since the second support grooves 22b and 22b and the first support grooves 35b and 35b are each formed in a shape that extends in the front/rear direction, the first turning shafts 35a and 35a can slide along the second support grooves 22b and 22b, respectively, and the second turning shafts 22a and 22a can slide along the first support grooves 35b and 35b, respectively.

The lens unit 21C can be turned with respect to the fixed member 22C in a first direction (yaw direction) about the second turning shafts 22a and 22a, and in a second direction (pitch direction) about the first turning shafts 35a and 35a. Further, the main body 34 of the lens unit 21C can be turned with respect to the support member 35 in the direction about the light axis (roll direction), which is a third direction.

The first drive magnets 24 and 24 attached to the lens unit 21C and the first drive coils 26 and 26 are respectively positioned facing the front/rear direction. A first drive unit 30 that turns the lens unit 21C in the first direction or the third direction is configured from the first drive magnets 24 and 24 and the first drive coils 26 and 26. In the first drive unit 30, one of the first drive magnets 24 and one of the first drive coils 26 act as a first thrust generation unit that imparts on the lens unit 21C a turning force (thrust) in the first direction or the third direction. Further, the other first drive magnet 24 and the other first drive coil 26 also act as a first thrust generation unit that imparts on the lens unit 21C a turning force (thrust) in the first direction or the third direction.

On the other hand, the second drive magnets 25 and 25 attached to the lens unit 21C and the second drive coils 27 and 27 are respectively positioned facing the front/rear direction. A second drive unit 31 that turns the lens unit 21C in the first direction or the third direction is configured from the second drive magnets 25 and 25 and the second drive coils 27 and 27. In the second drive unit 31, one of the second drive magnets 25 and one of the second drive coils 27 act as a second thrust generation unit that imparts on the lens unit 21C a turning force (thrust) in the second direction or the third direction. Further, the other second drive magnet 25 and the other second drive coil 27 also act as a second thrust generation unit that imparts on the lens unit 21C a turning force (thrust) in the second direction or the third direction.

It is noted that an example was described above in which the first drive magnets 24 and 24 and the first drive coils 26 and 26 of the first drive unit 30 are positioned vertically spaced apart, and the second drive magnets 25 and 25 and the second drive coils 27 and 27 of the second drive unit 31 are positioned horizontally spaced apart. However, the first drive magnets 24 and 24 and the first drive coils 26 and 26 of the first drive unit 30 may be positioned horizontally spaced apart, and the second drive magnets 25 and 25 and the second drive coils 27 and 27 of the second drive unit 31 may be positioned vertically spaced apart.

Further, an example was described above in which the second turning shafts 22a and 22a that function as a turning support in the first direction are provided on the fixed member 22C, and the first turning shafts 35a and 35a that function as a turning support in the second direction are provided on the lens unit 21C. However, conversely, the turning shafts that function as a turning support in the first direction may be provided on the lens unit, and the second turning shafts that function as a turning support in the second direction may be provided on the fixed member 22C. In this case, the support grooves into which the turning shafts that function as a turning support in the first direction are inserted are formed on the fixed member, and the support grooves into which the turning shafts that function as a turning support in the second direction are inserted are formed on the lens unit.

Further, although an example was described above in which the first drive magnets 24 and 24 and the second drive magnets 25 and 25 are arranged in the lens unit 21C, and the first drive coils 26 and 26 and the second drive coils 27 and 27 are arranged on the substrate 37, conversely, the drive coils may be arranged on the lens unit 21C and the drive magnets may be arranged on the substrate 37.

[Operation of the Image Blur Correction Apparatus (Second Embodiment)]

The blur correction operation performed in the image blur correction apparatus 20C will now be described.

In a state before the blur correction operation is carried out, the image blur correction apparatus 20C is at a reference position where there has been no turning in the first direction, or the second direction, or the third direction.

In the image blur correction apparatus 20C, when power is supplied to the first drive coils 26 and 26 of the first drive unit 30C so that, for example, thrust is produced in the same direction, a blur correction operation is carried out by the lens unit 21 turning in the first direction about the first supporting axis P. At this stage, the blur correction operation of the lens unit 21C is smoothly carried out by the first turning shafts 35a and 35a sliding along the second support grooves 22b and 22b, respectively, without the first turning shafts 35a and 35a causing any hindrance in the turning of the lens unit 21C.

On the other hand, when power is supplied to the second drive coils 27 and 27 of the second drive unit 31 so that, for example, thrust is produced in the same direction, a blur correction operation is carried out by the lens unit 21C turning in the second direction about the second first supporting axis Q. At this stage, the blur correction operation of the lens unit 21C is smoothly carried out by the second turning shafts 22a and 22a sliding along the first support grooves 35b and 35b, respectively, without the second turning shafts 22a and 22a causing any hindrance in the turning of the lens unit 21C.

Further, when the supply of power to the first drive coils 26 and 26 so that, for example, thrust is produced in the same direction, and the supply of power to the second drive coils 27 and 27 so that, for example, thrust is produced in the same direction, is carried out simultaneously, a blur correction operation is carried out by the lens unit 21C turning in the first direction about the first supporting axis P and the lens unit 21C turning in the second direction about the second first supporting axis Q. At this stage, the blur correction operation of the lens unit 21C is smoothly carried out by the first turning shafts 35a and 35a sliding along the second support grooves 22b and 22b, respectively, and the second turning shafts 22a and 22a sliding along the first support grooves 35b and 35b, respectively, without the first turning shafts 35a and 35a or the second turning shafts 22a and 22a causing any hindrance in the turning of the lens unit 21C.

In addition, when power is supplied to the first drive coils 26 and 26 of the first drive unit 30 so that, for example, thrust is produced in different directions, and power is supplied to the second drive coils 27 and 27 of the second drive unit 31 so that, for example, thrust is produced in different directions, a blur correction operation is carried out by the main body 34 sliding along the support member 35 and the lens unit 21C turning in the third direction. It is noted that even when the supply of power to the first drive coils 26 and 26 of the first drive unit 30 so that, for example, thrust is produced in different directions, and the supply of power to the second drive coils 27 and 27 of the second drive unit 31 so that, for example, thrust is produced in different directions, is carried out simultaneously, the main body 34 can slide along the support member 35, and the lens unit 21C can turn in the third direction.

Still further, when the supply of power to the first drive coils 26 and 26 so that, for example, thrust is produced in the same direction, and the supply of power to the second drive coils 27 and 27 so that, for example, thrust is produced in the same direction, is carried out simultaneously, if the power amount to the first drive coils 26 and 26 is different and the power amount to the second drive coils 27 and 27 is different, a blur correction operation is carried out by the lens unit 21C turning in the first direction about the first supporting axis P, the lens unit 21C turning in the second direction about the second first supporting axis Q, and the lens unit 21C also simultaneously turning in the third direction. At this stage, the blur correction operation of the lens unit 21C is smoothly carried out by the first turning shafts 35a and 35a sliding along the second support grooves 22b and 22b, respectively, and the second turning shafts 22a and 22a sliding along the first support grooves 35b and 35b, respectively, without the first turning shafts 35a and 35a or the second turning shafts 22a and 22a causing any hindrance in the turning of the lens unit 21C.

During the above blur correction operation, the position of the lens unit 21C in the first direction and the third direction is continuously detected by detecting changes in the magnetic field of the first drive magnets 24 and 24 with the first detection units 28 and 28, and the position of the lens unit 21C in the second direction and the third direction is continuously detected by detecting changes in the magnetic field of the second drive magnets 25 and 25 with the second detection units 29 and 29.

It is noted that even for the image blur correction apparatus 20C, similar to the image blur correction apparatus 20A according to the first modified example, instead of the regulating wall portions 22c and 22c, spring members 32, 32, . . . may be provided to regulate the movement of the lens unit 21C in the light axis direction (front/rear direction).

Further, even in the image blur correction apparatus 20C, similar to the image blur correction apparatus 20B according to the second modified example, the blur correction operation can be made smoother by providing the bearing members 33, 33, . . . (refer to FIG. 17).

As described above, in the image blur correction apparatus 20C, the first drive unit 30 and the second drive unit 31 are provided on the outer face side (rear face side) of the lens unit 21C in the light axis direction.

Therefore, the image blur correction apparatus 20C can be made more compact in the direction orthogonal to the light axis.

Further, the main body 34 and the support member 35 are provided in the lens unit 21C, and the main body 34 can turn on the support member 35 in the direction about the light axis.

Therefore, the lens unit 21C can also be turned in the direction about the light axis, which is the third direction, so that a blur correction operation can also be performed in the direction about the light axis. Consequently, a substantial improvement in image quality can be achieved.

In addition, the main body 34 is turned in the direction about the light axis by the turning actuator 36, which is configured from the first drive unit 30 and the second drive unit 31 that turn the lens unit 21C in the first direction and the second direction, respectively.

Therefore, a dedicated drive unit for turning the main body 34 in the direction about the light axis is not necessary, so that the configuration of the lens unit 21 can be made simpler and more compact due to a reduction in the number of parts and necessary space.

[Imaging Apparatus Embodiment]

Figure 18:
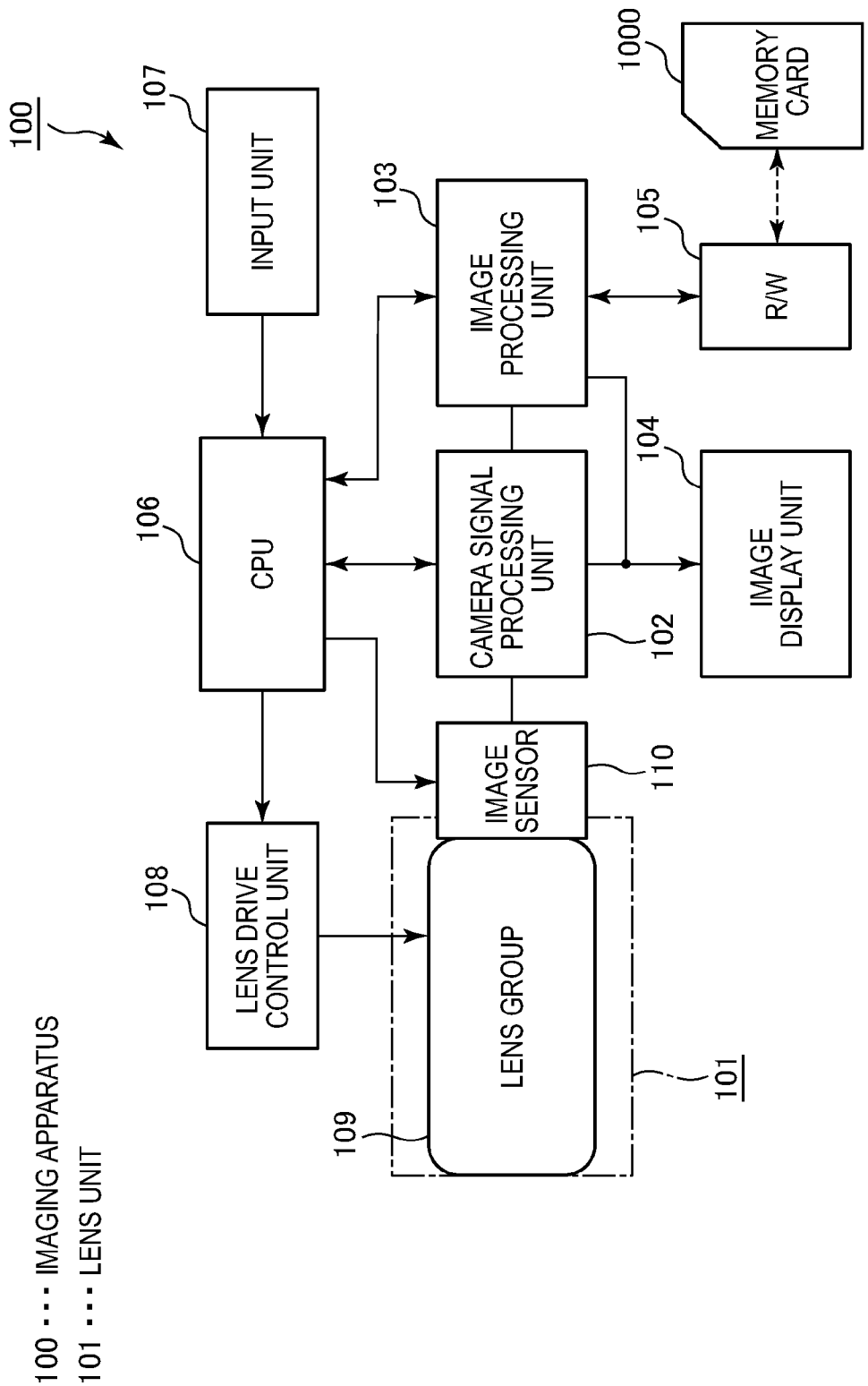
FIG. 18 is a block diagram of an imaging apparatus.

FIG. 18 illustrates a block diagram of a video camera according to an embodiment of the imaging apparatus of the present technology.

An imaging apparatus (video camera) 100 (corresponding to the imaging apparatus 1) has a lens unit 101 (corresponding to lens units 21, and 21C) that is responsible for an imaging function, a camera signal processing unit 102 that performs signal processing such as analog-digital conversion of a captured image signal, and an image processing unit 103 that performs recording and playback processing of the image signal. Further, the imaging apparatus 100 includes an image display unit 104 such as a liquid crystal panel, which displays captured images and the like, a R/W (reader/writer) 105 that reads/writes image signals from/to a memory card 1000, a CPU (central processing unit) 106 that controls the whole imaging apparatus 100, an input unit 107 (corresponding to operating switch 7, operating button 8, and operating button 10) configured from various switches and the like, on which operations are performed by the user, and a lens drive control unit 108 that controls the drive of the lenses arranged in the lens unit 101.

The lens unit 101 is configured from, for example, an optical system that includes a lens group 109 (corresponding to the lens group provided in the lens units 21, and 21C), and an image sensor 110 such as a CCD (charge-coupled device) or a CMOS (complementary metal-oxide semiconductor) and the like.

The camera signal processing unit 102 performs various types of signal processing, such as conversion of an output signal from the image sensor 110 into a digital signal, noise reduction, image correction, and conversion into luminance/color difference signal.

The image processing unit 103 performs, for example, compression and encoding/decompression and decoding of image signals based on a predetermined image data format, and conversion processing of the data specification, such as the resolution.

The image display unit 104 has a function for displaying various data, such as an operation state and captured images, on the input unit 107 of the user.

The R/W 105 performs writing of the image data encoded by the image processing unit 103 onto the memory card 1000 and reading of the image data recorded on the memory card 1000.

The CPU 106 functions as a control processing unit that controls the respective circuit blocks provided in the imaging apparatus 100, and controls the respective circuit blocks based on instruction input signals and the like from the input unit 107.

The input unit 107 is configured from, for example, a shutter release lever for performing a shutter operation, and a selection switch for selecting an operation mode. The input unit 107 outputs instruction input signals to the CPU 106 based on the operation made by the user.

The lens drive control unit 108 controls (not illustrated) motors and the like that drive the respective lenses of the lens group 109 based on control signals from the CPU 106.

The memory card 1000 is, for example, a semiconductor memory that can be inserted into and removed from a slot connected to the R/W 105.

The operations performed by the imaging apparatus 100 will now be described.

In an imaging standby state, under the control of the CPU 106, an image signal captured by the lens unit 101 is output to the image display unit 104 via the camera signal processing unit 102, and is displayed as a camera still image. Further, when an instruction input signal for zooming is input from the input unit 107, the CPU 106 outputs a control signal to the lens drive control unit 108, and a predetermined lens in the lens group 109 is moved based on a control from the lens drive control unit 108.

When a (not illustrated) shutter in the lens unit 101 is operated by an instruction input signal from the input unit 107, the captured image signal is output from the camera signal processing unit 102 to the image processing unit 103, subjected to compression and encoding processing, and is converted into digital data having a predetermined data format. The converted data is output to the R/W 105, and is written in the memory card 1000.

Focusing and zooming are performed by the lens drive control unit 108 moving a predetermined lens in the lens group 109 based on a control signal from the CPU 106.

When playing back image data recorded in the memory card 1000, based on an operation on the input unit 107, predetermined image data is read from the memory card 1000 by the R/W 105, and decompression and decoding processing is performed by the image processing unit 103. Then, the playback image signal is output to the image display unit 104, and the playback image is displayed.

[Conclusion]

As described above, for the imaging apparatus 1, second turning shafts 22*a* are inserted in lens units 21 and 21C, first support grooves 21*b* and 35*b* extending in the light axis direction are formed, first turning shafts 21*a* and 35*a* are inserted in fixed members 22 and 22C, and second support grooves 22*b* extending in the light axis direction are formed.

Therefore, since the blur correction operation is carried out in the first direction and the second direction by supporting lens units 21 and 21C on fixed members 22 and 22C, the number of parts is reduced, the size in the direction orthogonal to the light axis is reduced, and the configuration can be made more simple and more compact.

[Present Technology]

Additionally, the present technology may also be configured as below.

(1) An image blur correction apparatus including:

a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis;

a fixed member configured to turnably support the lens unit in the first direction and the second direction;

a first drive unit configured to turn the lens unit in the first direction; and a second drive unit configured to turn the lens unit in the second direction, wherein the lens unit is provided thereon with a first turning shaft that acts as a turning support in one of the first direction and the second direction, and whose center axis is in line with one of the first supporting axis and the second supporting axis, wherein the fixed member is provided thereon a second turning shaft that acts as a turning support in another of the first direction and the second direction, and whose center axis is in line with another of the first supporting axis and the second supporting axis, wherein a first support groove into which the second turning shaft is inserted, that acts as a bearing for the second turning shaft, and that extends in a light axis direction is formed on the lens unit, and wherein a second support groove into which the first turning shaft is inserted, that acts as a bearing for the first turning shaft, and that extends in the light axis direction is formed on the fixed member.

(2) The blur correction apparatus according to (1), wherein a regulating portion is provided that is configured to regulate movement of the lens unit in the light axis direction with respect to the fixed member.

(3) The blur correction apparatus according to (2), wherein the fixed member is provided thereon, as the regulating portion, an arc-shaped regulating wall portion along which a tip of the first turning shaft slides, and that is formed using, as a center, an intersection of the first supporting axis and the second supporting axis.

(4) The blur correction apparatus according to (2), wherein as the regulating portion, a spring member that is supported between the lens member and the fixed unit is provided.

(5) The blur correction apparatus according to any one of (1) to (4), wherein a bearing member is provided that is rotatably supported by at least one of the first turning shaft and the second turning shaft, and that is inserted into the first support groove or the second support groove.

(6) The blur correction apparatus according to (5), wherein the bearing member is supported by each of the first turning shaft and the second turning shaft.

(7) The blur correction apparatus according to (5) or (6), wherein an outer periphery of the bearing member is formed as a slanted face, and wherein an extended line connecting an outer edge and an inner edge of the outer periphery in an axis direction of the bearing member is in line with an intersection of a center axis of the first turning shaft and a center axis of the second turning shaft.

(8) The blur correction apparatus according to any one of (1) to (7), wherein the first drive unit and the second drive unit are provided on an outer face side of the lens unit in a light axis direction.

(9) The blur correction apparatus according to (8), wherein a main body configured to include the lens and a support member configured to turnably support the main body in a direction about the light axis are provided on the lens unit, wherein the first turning shaft is provided on the support member, and the first support groove is formed in the support member, and wherein the main body is turnable in a direction about the light axis.

(10) The blur correction apparatus according to (9), wherein a turning actuator is configured from the first drive unit and the second drive unit, and wherein the main body is turned in the direction about the light axis by the turning actuator.

(11) An imaging apparatus including:

an image blur correction apparatus configured to include a lens unit that includes at least one lens and an outer housing that has the lens unit arranged therein, wherein the lens unit is configured to correct image blur by turning in a first direction which is a direction about a first supporting axis that is orthogonal to a light axis of the lens with respect to the outer housing, and in a second direction which is a direction about a second supporting axis that is orthogonal to the light axis and the first supporting axis, and wherein the image blur correction apparatus includes a fixed member configured to turnably support the lens unit in the first direction and the second direction, a first drive unit configured to turn the lens unit in the first direction, and a second drive unit configured to turn the lens unit in the second direction, wherein the lens unit is provided thereon a first turning shaft that acts as a turning support in one of the first direction and the second direction, and whose center axis is in line with one of the first supporting axis and the second supporting axis, wherein the fixed member is provided thereon a second turning shaft that acts as a turning support in another of the first direction and the second direction, and whose center axis is in line with another of the first supporting axis and the second supporting axis, wherein a first support groove into which the second turning shaft is inserted, that acts as a bearing for the second turning shaft, and that extends in a light axis direction is formed on the lens unit, and wherein a second support groove into which the first turning shaft is inserted, that acts as a bearing for the first turning shaft, and that extends in the light axis direction is formed on the fixed member.

The specific shapes and structures of the respective parts illustrated in the above-described best mode are merely illustrative of one example of a specific implementation of the present technology. The technical scope of the present technology is not to be interpreted in a limited manner by these.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-122332 filed in the Japan Patent Office on May 29, 2012, the entire content of which is hereby incorporated by reference.

What is claimed is:

1. A blur correction apparatus comprising:
a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis;
a fixed member configured to turnably support the lens unit in the first direction and the second direction;
a first drive unit configured to turn the lens unit in the first direction; and
a second drive unit configured to turn the lens unit in the second direction,
wherein the lens unit is provided thereon with a first turning shaft that acts as a turning support in one of the first direction and the second direction, and whose center axis is in line with one of the first supporting axis and the second supporting axis,
wherein the fixed member is provided thereon a second turning shaft that acts as a turning support in another of the first direction and the second direction, and whose center axis is in line with another of the first supporting axis and the second supporting axis,
wherein a first support groove into which the second turning shaft is inserted, that acts as a bearing for the second turning shaft, and that extends in a light axis direction is formed on the lens unit, and
wherein a second support groove into which the first turning shaft is inserted, that acts as a bearing for the first turning shaft, and that extends in the light axis direction is formed on the fixed member,
wherein the first drive unit and the second drive unit are provided on an outer face side of the lens unit in a light axis direction,
wherein a main body configured to include the lens and a support member configured to turnably support the main body in a direction about the light axis are provided on the lens unit,
wherein the first turning shaft is provided on the support member, and the first support groove is formed in the support member, and
wherein the main body is turnable in a direction about the light axis.

2. The blur correction apparatus according to claim 1, wherein a regulating portion is provided that is configured to regulate movement of the lens unit in the light axis direction with respect to the fixed member.

3. The blur correction apparatus according to claim 2, wherein the fixed member is provided thereon, as the regulating portion, an arc-shaped regulating wall portion along which a tip of the first turning shaft slides, and that is formed using, as a center, an intersection of the first supporting axis and the second supporting axis.

4. A blur correction apparatus comprising:
a lens unit that configured to include at least one lens, and configured to turnable in a first direction which is a direction about a first supporting axis that is orthogonal to a light axis of the lens with respect to an outer housing, and in a second direction which is a direction about a second supporting axis that is orthogonal to the light axis and the first supporting axis;
a fixed member configured to turnably support the lens unit in the first direction and the second direction;
a first drive unit configured to turn the lens unit in the first direction; and
a second drive unit configured to turn the lens unit in the second direction,
wherein the lens unit is provided thereon with a first turning shaft that acts as a turning support in one of the first direction and the second direction, and whose center axis is in line with one of the first supporting axis and the second supporting axis,
wherein the fixed member is provided thereon a second turning shaft that acts as a turning support in another of the first direction and the second direction, and whose center axis is in line with another of the first supporting axis and the second supporting axis,
wherein a first support groove into which the second turning shaft is inserted, that acts as a bearing for the second turning shaft, and that extends in a light axis direction is formed on the lens unit,
wherein a second support groove into which the first turning shaft is inserted, that acts as a bearing for the first turning shaft, and that extends in the light axis direction is formed on the fixed member, and
wherein a bearing member is provided that is rotatably supported by at least one of the first turning shaft and the second turning shaft, and that is inserted into the first support groove or the second support groove.

5. The blur correction apparatus according to claim 4, wherein the bearing member is supported by each of the first turning shaft and the second turning shaft.

6. The blur correction apparatus according to claim 4,
wherein an outer periphery of the bearing member is formed as a slanted face, and
wherein an extended line connecting an outer edge and an inner edge of the outer periphery in an axis direction of the bearing member is in line with an intersection of a center axis of the first turning shaft and a center axis of the second turning shaft.

7. A blur correction apparatus comprising:
a first turning shaft protruding from a surface of a lens unit, a first support groove extending into the lens unit from the surface of the lens unit;
a second turning shaft protruding from a surface of a fixed member, a second support groove extending into the fixed member from the surface of the fixed member; and a different first support groove extending into the lens unit from the surface of the lens unit, the first support groove is between the second turning shaft and the different first support groove, wherein the second turning shaft extends into the first support groove along a first supporting axis, the first turning shaft extending into the second support groove along a second supporting axis.

8. The blur correction apparatus according to claim 7, further comprising:

an imaging lens affixed to the lens unit.

9. The blur correction apparatus according to claim 7, wherein the second supporting axis intersects the first supporting axis.

10. The blur correction apparatus according to claim 7, wherein the first supporting axis is orthogonal to the second supporting axis.

11. The blur correction apparatus according to claim 7, wherein an intersection of the first supporting axis and the second supporting axis is in the lens unit.

12. The blur correction apparatus according to claim 7, wherein the first turning shaft is rotatable about the second supporting axis.

13. The blur correction apparatus according to claim 7, wherein the second turning shaft is rotatable about the first supporting axis.

14. The blur correction apparatus according to claim 7, wherein the fixed member surrounds the lens unit.

15. The blur correction apparatus according to claim 7, wherein the first support groove is between a lens unit drive magnet and a different lens unit drive magnet.

16. The blur correction apparatus according to claim 7, wherein the second support groove is between a fixed member drive magnet and a different fixed member drive magnet.

17. The blur correction apparatus according to claim 16, wherein a fixed member drive coil surrounds the fixed member drive magnet and a different fixed member drive coil surrounds the different fixed member drive magnet.

18. The blur correction apparatus according to claim 7, wherein the first turning shaft extends through the second support groove.

19. The blur correction apparatus according to claim 18, further comprising:

a regulating portion of the fixed member that regulates movement of the first turning shaft, the first turning shaft extending to the regulating portion.

20. The blur correction apparatus according to claim 7 further comprising:

a different second turning shaft protruding from the surface of the fixed member and extending into the different first support groove.

21. An imaging apparatus comprising:

the blur correction apparatus according to claim 7; and a lens drive control unit that controls a movement of the lens unit.

22. A blur correction apparatus comprising:

a first turning shaft protruding from a surface of a lens unit
a first support groove extending into the lens unit from the surface of the lens unit;

a second turning shaft protruding from a surface of a fixed member, a second support groove extending into the fixed member from the surface of the fixed member; and a different second support groove extending into the fixed member from the surface of the fixed member, the second support groove is between the first turning shaft and the different second support groove, wherein the second turning shaft extends into the first support groove along a first supporting axis, the first turning shaft extending into the second support groove along a second supporting axis.

23. The blur correction apparatus according to claim 22, further comprising:

a different first turning shaft protruding from the surface of the lens unit and extending into the different second support groove.

* * * * *